US008775516B2

(12) United States Patent
Natori et al.

(10) Patent No.: US 8,775,516 B2
(45) Date of Patent: Jul. 8, 2014

(54) PROJECTOR SYSTEM AND CONNECTION ESTABLISHMENT METHOD

(75) Inventors: Takashi Natori, Suwa (JP); Yoshiharu Konishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 519 days.

(21) Appl. No.: 13/069,809

(22) Filed: Mar. 23, 2011

(65) Prior Publication Data

US 2011/0238808 A1 Sep. 29, 2011

(30) Foreign Application Priority Data

Mar. 26, 2010 (JP) ................................. 2010-072422
Jan. 17, 2011 (JP) ................................. 2011-006678

(51) Int. Cl.
*G06F 15/16* (2006.01)
*H04N 5/64* (2006.01)
*G03B 21/26* (2006.01)

(52) U.S. Cl.
USPC .............................. 709/204; 348/744; 353/30

(58) Field of Classification Search
USPC ................................ 710/72; 709/224; 353/30
See application file for complete search history.

(56) References Cited

U.S. PATENT DOCUMENTS

| | | | | |
|---|---|---|---|---|
| 5,119,496 A * | 6/1992 | Nishikawa et al. | ........... | 710/269 |
| 5,469,549 A * | 11/1995 | Simpson et al. | .............. | 709/213 |
| 5,616,914 A * | 4/1997 | Matsuda | .................... | 250/208.1 |
| 5,644,716 A * | 7/1997 | Autechaud et al. | .......... | 709/213 |
| 5,768,528 A * | 6/1998 | Stumm | ......................... | 709/231 |
| 6,189,050 B1 * | 2/2001 | Sakarda | .......................... | 710/18 |
| 6,256,411 B1 * | 7/2001 | Iida | ............................... | 382/203 |
| 6,449,004 B1 * | 9/2002 | Okisu et al. | ...................... | 348/44 |
| 6,829,664 B2 * | 12/2004 | Nomizo et al. | ................. | 710/72 |
| 6,950,869 B2 * | 9/2005 | Iizuka | ............................... | 709/224 |
| 7,059,722 B2 * | 6/2006 | Matoba et al. | .................. | 353/30 |
| 7,752,353 B2 * | 7/2010 | Perry et al. | ...................... | 710/48 |
| 8,424,024 B2 * | 4/2013 | Remmert | ...................... | 719/328 |
| 2002/0113952 A1 * | 8/2002 | Matoba et al. | ............... | 353/122 |
| 2003/0110217 A1 * | 6/2003 | Raju | .................................. | 709/204 |
| 2003/0126326 A1 * | 7/2003 | Nomizo et al. | .................. | 710/72 |
| 2004/0130502 A1 * | 7/2004 | Sato et al. | ...................... | 345/2.1 |
| 2005/0071430 A1 | 3/2005 | Kobayashi et al. | | |
| 2006/0187425 A1 * | 8/2006 | Matoba et al. | .................. | 353/119 |
| 2006/0187426 A1 * | 8/2006 | Matoba et al. | .................. | 353/121 |
| 2009/0031061 A1 * | 1/2009 | Lee | .................................. | 710/63 |
| 2009/0106469 A1 * | 4/2009 | Perry et al. | ..................... | 710/268 |
| 2009/0164408 A1 * | 6/2009 | Grigorik et al. | .................. | 707/1 |
| 2009/0184924 A1 * | 7/2009 | Uchida | .......................... | 345/157 |
| 2009/0239502 A1 * | 9/2009 | Dempo et al. | ................. | 455/411 |

(Continued)

FOREIGN PATENT DOCUMENTS

JP    A-2003-91488    3/2003
JP    A-2006-3903     1/2006

*Primary Examiner* — Brian P Whipple
*Assistant Examiner* — Michael A Chambers
(74) *Attorney, Agent, or Firm* — Oliff PLC

(57) ABSTRACT

A projector system includes: a plurality of computers connected to a network; and a plurality of projectors connected to the network, wherein each of the computers includes a connection request unit which gives a connection request to an arbitrary projector connected to the network, and each of the projectors includes a group information acquisition unit which acquires group information including apparatus IDs of the respective projectors of a group to which the own apparatus belongs, and a connection request unit which requests the projectors excluding the own apparatus among the projectors of the group to connection with an arbitrary computer, referring to the group information, when receiving the connection request from the arbitrary computer.

20 Claims, 19 Drawing Sheets

(56) References Cited

U.S. PATENT DOCUMENTS

| | | | |
|---|---|---|---|
| 2010/0241507 A1* | 9/2010 | Quinn et al. | 705/14.42 |
| 2011/0054647 A1* | 3/2011 | Chipchase et al. | 700/94 |
| 2011/0066941 A1* | 3/2011 | Chipchase et al. | 715/716 |
| 2011/0158199 A1* | 6/2011 | Zhai | 370/329 |

\* cited by examiner

GROUP INFORMATION

| GROUP NAME | APPARATUS ID OF CONNECTED PC | APPARATUS ID OF CONNECTED PJ | GROUP INFORMATION GENERATION TIME |
|---|---|---|---|
| GROUP A | PC1 | PJ1, PJ2 | 20xx/xx/01 xx:xx:xx |
| GROUP B | PC1, PC2 | PJ1, PJ2, PJ4 | 20xx/xx/02 xx:xx:xx |
| GROUP C | PC1 | PJ1, PJ2, PJ3 | 20xx/xx/03 xx:xx:xx |

| PROJECTOR LIST | | | |
|---|---|---|---|
| STATUS | PROJECTOR NAME | IP ADDRESS | COMMENT |
| ☑ ⊂⊃ | PJ1 | 10.10xx | 102 CONFERENCE ROOM LEFT |
| ☐ ⊂⊃ | PJ2 | 10.10xx | 102 CONFERENCE ROOM CENTER |

CONNECTED PROJECTOR LIST
☑  PJ1  10.10xx  102 CONFERENCE ROOM LEFT

[ CONNECTION ] /71

FIG. 5B

| PROJECTOR LIST | | | |
|---|---|---|---|
| STATUS | PROJECTOR NAME | IP ADDRESS | COMMENT |
| ☑ ⊂⊃ | PJ1 | 10.10xx | 102 CONFERENCE ROOM LEFT |
| ☑ ⊂⊃ | PJ2 | 10.10xx | 102 CONFERENCE ROOM CENTER |

CONNECTED PROJECTOR LIST
☑ PJ1  10.10xx  102 CONFERENCE ROOM LEFT
☑ PJ2  10.10xx  102 CONFERENCE ROOM CENTER

72 ~ [ GROUPING ]  [ CONNECTION ] /71

FIG. 5C

| PROJECTOR LIST | | | |
|---|---|---|---|
| STATUS | PROJECTOR NAME | IP ADDRESS | COMMENT |
| ☑ ⊂⊃ | PJ1 | 10.10xx | 102 CONFERENCE ROOM LEFT |
| ☑ ⊂⊃ | PJ2 | 10.10xx | 102 CONFERENCE ROOM CENTER |

CONNECTED PROJECTOR LIST
☑ GROUP A ─┬─ PJ1  10.10xx  102 CONFERENCE ROOM LEFT
           └─ PJ2  10.10xx  102 CONFERENCE ROOM CENTER

[ CONNECTION ] /73

FIG. 7A

| PROJECTOR LIST | | | |
|---|---|---|---|
| STATUS | PROJECTOR NAME | IP ADDRESS | COMMENT |
| ☑ ⊂⊚ | PJ1 | 10.10xx | 102 CONFERENCE ROOM LEFT |
| ☑ ⊂⊚ | PJ2 | 10.10xx | 102 CONFERENCE ROOM CENTER |
| ☐ ⊂⊚ | PJ3 | 10.10xx | 102 CONFERENCE ROOM RIGHT |

CONNECTED PROJECTOR LIST
☑ GROUP A ─┬─ PJ1  10.10xx  102 CONFERENCE ROOM LEFT
          └─ PJ2  10.10xx  102 CONFERENCE ROOM CENTER

[ADDITION] /75

FIG. 7B

| PROJECTOR LIST | | | |
|---|---|---|---|
| STATUS | PROJECTOR NAME | IP ADDRESS | COMMENT |
| ☑ ⊂⊚ | PJ1 | 10.10xx | 102 CONFERENCE ROOM LEFT |
| ☑ ⊂⊚ | PJ2 | 10.10xx | 102 CONFERENCE ROOM CENTER |
| ☑ ⊂⊚ | PJ3 | 10.10xx | 102 CONFERENCE ROOM RIGHT |

[DISCONNECTION] /76

FIG. 7C

| PC LIST | | | |
|---|---|---|---|
| STATUS | USER NAME | IP ADDRESS | COMMENT |
| ☐ 👤 | User1 | xx.xxxx | Note PC |
| ☐ 👤 | User2 | xx.xxxx | Desktop PC |

[DISCONNECTION] /76

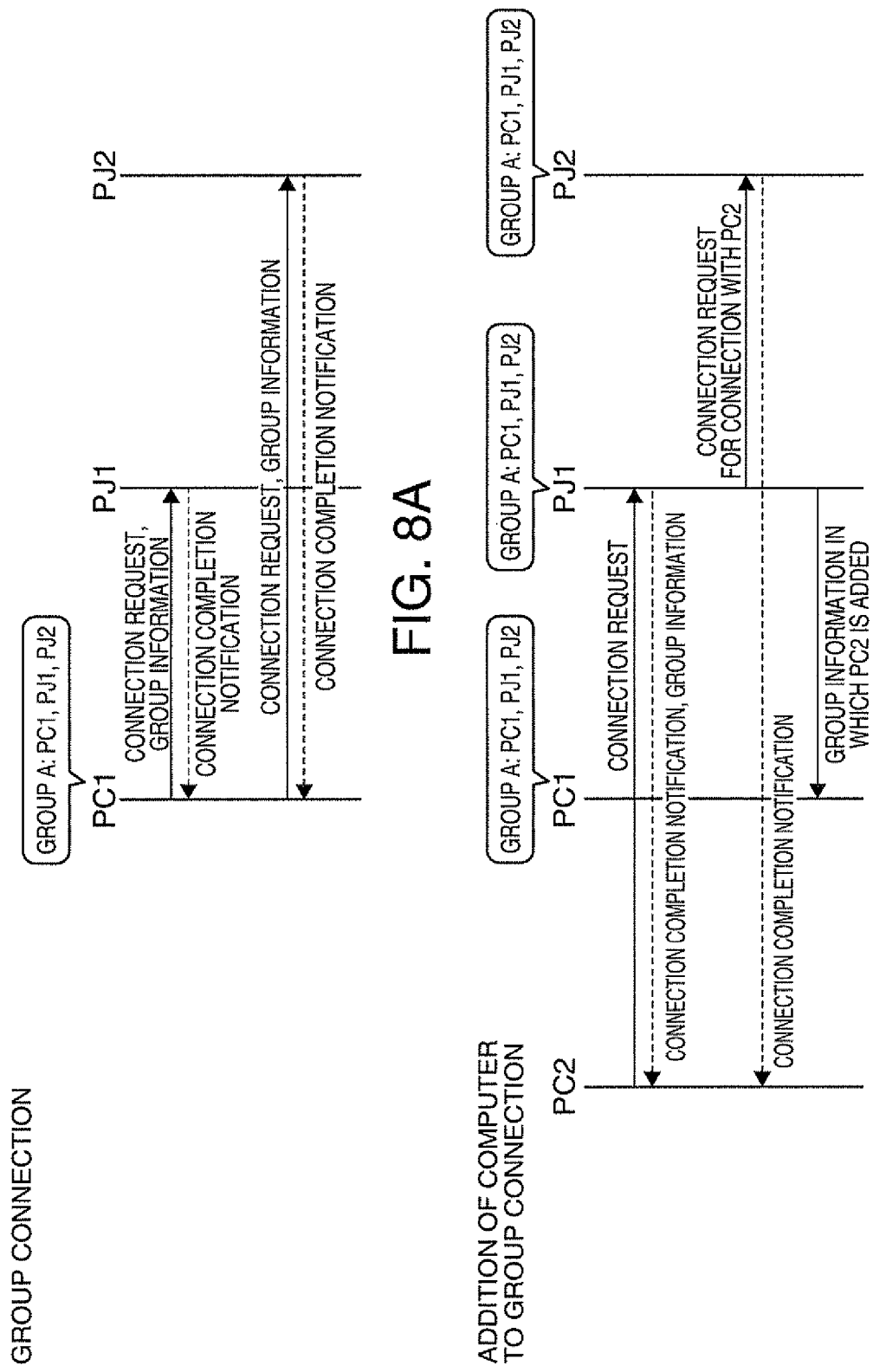

FIG. 13A

```
PC LIST
STATUS   USER NAME   IP ADDRESS   COMMENT
☑   👤   User1   10.10xx   Note PC
☑   ...
         ┌─────────────────────────────┐
         │ DO YOU PRESERVE            │
         │ GROUP INFORMATION?         │
         │   ┌─────┐   ┌─────┐         │
         │   │ YES │   │ NO  │         │─77
         │   └─────┘   └─────┘         │
         └─────────────────────────────┘

┌──────────────┐
                                   │ DISCONNECTION │─76
                                   └──────────────┘
```

FIG. 13B

```
PREVIOUS CONNECTION INFORMATION
STATUS   APPARATUS NAME   IP ADDRESS   COMMENT
☑   ⊂⊃   PJ1   10.10xx   102 CONFERENCE ROOM LEFT
☐   ⊂⊃   PJ2   10.10xx   102 CONFERENCE ROOM CENTER
░░░░ PJ3   10.10xx   102 CONFERENCE ROOM RIGHT
☐   👤   User1   xx.xxxx   Note PC
☐   👤   User2   xx.xxxx   Desktop PC CONNECTED PROJECTOR LIST
☐ GROUP A ┬─ PJ1   10.10xx   102 CONFERENCE ROOM LEFT
          ├─ PJ2   10.10xx   102 CONFERENCE ROOM CENTER
          └─ PJ3   10.10xx   102 CONFERENCE ROOM RIGHT
                                              ┌────────────┐
                                              │ CONNECTION │─71
                                              └────────────┘
```

FIG. 13C

```
PROJECTOR LIST
STATUS   PROJECTOR NAME   IP ADDRESS   COMMENT
☐   ⊂⊃   PJ1   10.10xx   102 CONFERENCE ROOM LEFT
☐   ⊂⊃   PJ2   10.10xx   102 CONFERENCE ROOM CENTER
☐   ⊂⊃   PJ3   10.10xx   102 CONFERENCE ROOM RIGHT

CONNECTED PROJECTOR LIST
☐ GROUP A ┬─ PJ1   10.10xx   102 CONFERENCE ROOM LEFT
          ├─ PJ2   10.10xx   102 CONFERENCE ROOM CENTER
          └─ PJ3   10.10xx   102 CONFERENCE ROOM RIGHT
                                              ┌──────────────┐
                                              │ DISCONNECTION │─76
                                              └──────────────┘
```

PROJECTOR SYSTEM AND CONNECTION ESTABLISHMENT METHOD

BACKGROUND

1. Technical Field

The present invention relates to a projector system and a connection establishment method capable of establishing connection between a computer and a plurality of projectors connected to a network.

2. Related Art

In the past, there was known a control system as a projector system in which the same projection image is projected concurrently from a plurality of projectors by performing synchronous control on the plurality of projectors connected to a single computer (control apparatus) via a network by the computer (see JP-A-2006-003903). In the control system, a projector management unit of the computer detects and registers the plurality of projectors connected to the computer to recognize the plurality of projectors to be synchronously controlled.

For example, when a plurality of projectors concurrently project images in a large conference or presentation, a plurality of presenters sequentially desire to give a presentation (concurrent projection) using an individual computer in some cases. However, in the control system, a problem may arise in that when the plurality of projectors concurrently project images, it takes some time to form connection due to the fact that a plurality of computers each has to search and register the plurality of projectors.

SUMMARY

An advantage of some aspects of the invention is that it provides a projector system and a connection establishment method capable of easily connecting an arbitrary computer to a plurality of projectors.

According to an aspect of the invention, there is provided a projector system including a plurality of computers connected to a network and a plurality of projectors connected to the network. Each of the computers includes a connection request unit which gives a connection request to an arbitrary projector connected to the network. Each of the projectors includes a group information acquisition unit which acquires group information including apparatus IDs of the respective projectors of a group to which the own apparatus belongs; and a connection request unit which requests the projectors excluding the own apparatus among the projectors of the group to establish connection with an arbitrary computer, referring to the group information, when receiving the connection request from the arbitrary computer.

According to another aspect of the invention, there is provided a connection establishment method of establishing connection between a plurality of computers and a plurality of projectors connected to a network. The connection establishment method includes giving, by an arbitrary computer of the plurality of computers, a connection request to an arbitrary projector of the plurality of projectors; acquiring, by each of the plurality of projectors, group information including apparatus IDs of the projectors of a group to which the own apparatus belongs; and requesting, by the arbitrary projector, the projectors excluding the own apparatus among the projectors of the group to establish connection with an arbitrary computer, referring to the group information, when the arbitrary projector receives the connection request from the arbitrary computer.

With such a configuration, the computer can automatically connect with all of the projectors of the group just by gives the connection request to one arbitrary projector among the plurality of grouped projectors. Thus, when the plurality of projectors concurrently performs projection, the computer can connect with the plurality of projectors quickly and easily without searching and designating the projectors or giving the connection request to the projectors.

It is preferable that at least one computer of the plurality of computers further includes a group information generation unit which groups the plurality of arbitrary projectors connected to the network and generating the group information and each of the projectors may acquire the group information from the one computer.

With such a configuration, the desired projectors can be selected and grouped among the projectors connected to the network. Moreover, the projector can recognize that the computer has been connected to a given projector connected to the network by acquiring the group information from the computer. Furthermore, the projectors may simultaneously acquire the group information when the projectors receive the connection request from the computer generating the group information or before the projectors receive the connection request.

It is preferable that each of the projectors further includes a group information transmission unit which transmits the group information to the projectors excluding own apparatus, when receiving the connection request from the arbitrary computer.

With such a configuration, all of the projectors of the group can share the up-to-date group information. That is, when the computer adds a new projector to the group and the projector receives the connection request, it is possible to recognize that the projector is added to the group by transmitting the up-to-date group information including the apparatus ID of the own apparatus to the projectors excluding own apparatus. In other words, with such a configuration, a new projector can be added to the connection, while the connection of the formed group is maintained.

It is desirable that the group information includes apparatus IDs of the respective computers of the group, and the connection request unit of each projector requests the computers excluding the computer receiving the connection request among the computers of the group to connection with the own apparatus, referring to the group information, when receiving the connection request from the arbitrary computer.

With such a configuration, when there is the plurality of computers in the group, it is possible to establish the connection between all of the computers of the group and the desired projector, just by giving the connection request from one arbitrary computer to the desired projector. In particular, when a new projector is added to the group to which one arbitrary computer belongs (when the connection is established between one arbitrary computer and the corresponding projector), the connection is automatically established between the other computers and the corresponding projector and the other computer can recognize that the corresponding project has been added to the group. That is, with such a configuration, a new projector can be added to the connection, while the connection of the formed group is maintained. In this case, the connection request may be given to the other computers and the group information may be transmitted to the other computers.

It is desirable that each of the projectors further includes a group information storage unit which stores the group information; a group information determination unit which determining whether the group information is stored in the group information storage unit, when receiving the connection request from the arbitrary computer; and a group information generation unit which generates the apparatus IDs of the respective projectors of the group and an apparatus ID of the computer giving the connection request, when the group information determination unit which determines that the group information is not stored and the plurality of projectors including the own apparatus is grouped by the connection request. It is desirable that the group information storage unit which stores the group information generated by the group information generation unit.

With such a configuration, when one arbitrary computer gives the connection request to the plurality of projectors just once, the group information can be stored in the projectors. Thus, when just giving the connection request to only one projector of the group, the computer subsequent to the second or later connected computer intending to establish the connection can be connected to all of the projectors of the group. Therefore, a process of giving the connection request to the other projectors can be omitted. Moreover, since it is not necessary to store the group information in advance in each projector, it is possible to freely select the plurality of projectors intending to concurrently perform projections when the initial one computer gives the connection request.

It is desirable that each of the projectors further includes, a connection request determination unit which determines whether there is another projector to which the arbitrary computer gives the connection request, when the group information determination unit which determines that the group information is stored. It is desirable that when the connection request determination unit which determines that there is another projector to which the arbitrary computer gives the connection request, the connection request unit does not give the connection request to the another projector.

With such a configuration, the projector does not give the connection request to the other projectors, when the computer giving the connection request to the own apparatus gives the connection request to the other projectors of the group at the same time. Accordingly, it is possible to prevent the repeated connection request.

It is desirable that each of the computers further includes a disconnection request unit which gives a connection disconnecting request to the arbitrary projector of the group. It is desirable that each of the projectors further includes a disconnection request unit which requests the computer which has not received the connection disconnecting request among the computers of the group to disconnect the connection from the own apparatus, when receiving the connection disconnecting request from the arbitrary computer.

With such a configuration, when there is the plurality of computers in the group, it is possible to disconnect the connection between all of the computers of the group and the desired projector, just by giving the connection disconnecting request from one arbitrary computer to the desired projector.

It is desirable that each of the computers further includes a disconnection request unit which gives a connection disconnecting request to the arbitrary projector. It is desirable that each of the projectors further includes a disconnection request unit which requests the projectors excluding the own apparatus among the projectors of the group to disconnect the connection from the computer, when receiving the connection disconnecting request from the arbitrary computer.

With such a configuration, it is possible to automatically disconnect the connection with all of the projectors of the group, just by giving the connection disconnecting request to one arbitrary projector among the plurality of grouped projectors. Moreover, when the plurality of computers is connected to the group, only the desired computer can be disconnected, while the connection of the group is maintained. This is because the connection is maintained between the computers excluding the computer giving the connection disconnecting request between the plurality of projectors.

It is desirable that each of the projectors further includes a group information transmission unit which transmits group information excluding the apparatus ID of the own apparatus to the projectors excluding the own apparatus among the projectors of the group, when receiving the connection disconnecting request from the arbitrary computer.

With such a configuration, when an arbitrary projector receives the connection disconnecting request, all of the projectors of the group can share the up-to-date group information. That is, it is possible to recognize that the projector of the group has been disconnected from the group, just by transmitting the up-to-date group information excluding the apparatus ID of the own apparatus to the projectors excluding own apparatus. In other words, with such a configuration, an arbitrary projector can be disconnected from the connection, while the connection of the formed group is maintained.

It is desirable that each of the computers further includes a group information storage unit storing the group information in a non-volatile manner, and a display unit reading and displaying the group information stored in the group information storage unit.

With such a configuration, a user operating the computer can select the projector to be connected, referring to the group information. It is desirable that the display unit which displays the group information so that the apparatus IDs of the apparatuses which can currently be connected to the group are distinguished from the apparatus IDs of the apparatuses which may not be connected to the group among the apparatus IDs included in the group information.

It is desirable that the group information storage unit of each projector which stores the group information in a non-volatile manner. It is desirable that each of the computers further includes a group information reading unit which reads the group information stored the group information storage unit of each projector.

With such a configuration, it is possible to give the connection request to the other projectors using the group information, just by connecting the computer to one arbitrary projector and reading the group information from the one arbitrary projector.

It is desirable that the computer further includes a group information acquisition unit which acquires group information regarding a group formed by apparatuses excluding the own apparatus which are connected to the network.

With such a configuration, the computer can confirm the group information of the group formed by the apparatuses excluding the own apparatus.

BRIEF DESCRIPTION OF THE DRAWINGS

The invention will be described with reference to the accompanying drawings, wherein like numbers reference like elements.

FIG. 3 is a diagram illustrating the storage details of a group information storage unit of the computer.

FIG. 5A is a diagram illustrating an example of a computer screen when connection is established with a single projector.

FIG. 5B is a diagram illustrating an example of a computer screen when a plurality of projectors is grouped.

FIG. 5C is a diagram illustrating an example of a computer screen after the plurality of projectors is group-operated.

FIG. 7A is a diagram illustrating an example of a computer screen when a projector is added to the group connection.

FIG. 7B is a diagram illustrating an example of a computer screen when a projector is disconnected from the group connection.

FIG. 7C is a diagram illustrating an example of a computer screen when a computer is disconnected from the group connection.

FIG. 8A is a diagram illustrating the operations of respective apparatuses when the group connection is established.

FIG. 8B is a diagram illustrating the operations of the respective apparatuses when a computer is added to the group connection.

FIG. 13A is a diagram illustrating an example of a computer screen displayed after the group connection is released.

FIG. 13B is a diagram illustrating an example of a computer screen when subsequent group connection is established using stored group information.

FIG. 13C is a diagram illustrating an example of a computer screen when the group information stored in a projector is read.

DESCRIPTION OF EXEMPLARY EMBODIMENTS

First Embodiment

Figure 1:
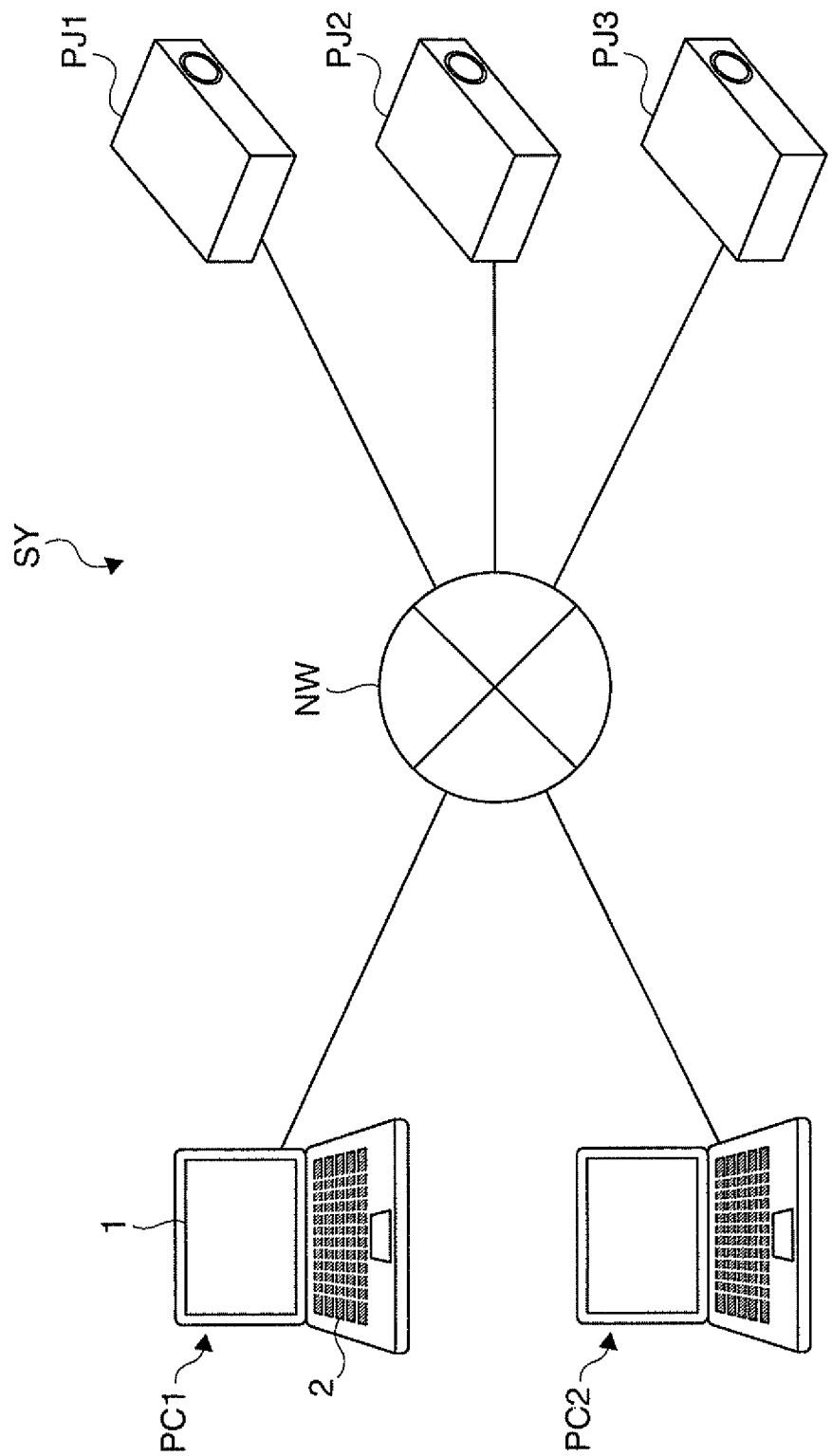
FIG. 1 is a diagram illustrating the connection configuration of a projector system.

Hereinafter, a projector system according to a first embodiment of the invention will be described with reference to the accompanying drawings. As shown in FIG. 1, a projector system SY includes a plurality of computers PC1 and PC2 and a plurality of projectors PJ1, PJ2, and PJ3 which are communicable to each other via a network. In the projector system SY, an arbitrary computer PC establishes connection with the plurality of projectors PJ1, PJ2, and PJ3 so that output images from the computer PC1 and PC2 are concurrently projected by the plurality of grouped projectors PJ1, PJ2, and PJ3 in the network connected state. Hereinafter, connection in which the plurality of projectors PJ1, PJ2, and PJ3 are grouped and the connection thereof is established is referred to as "group connection". It is assumed that a network NW may include the Internet or a local network. In addition, the connection may be realized by a wireless communication line or a wired communication line in which a cable or the like is used.

In this embodiment, the computer PC1 or PC2 groups an arbitrary plurality of projectors PJ1, PJ2, and PJ3 connected to the network and generates group information. The group information mainly includes a group name of the group and an apparatus ID of the apparatuses belonging to the group (see FIG. 3). The apparatus ID is used for the apparatuses connected to the network NW to recognize one another. In this embodiment, the apparatus name is used as the apparatus ID in the following description. For example, the apparatus ID of the computer PC1 is "PC1".

Figure 2:
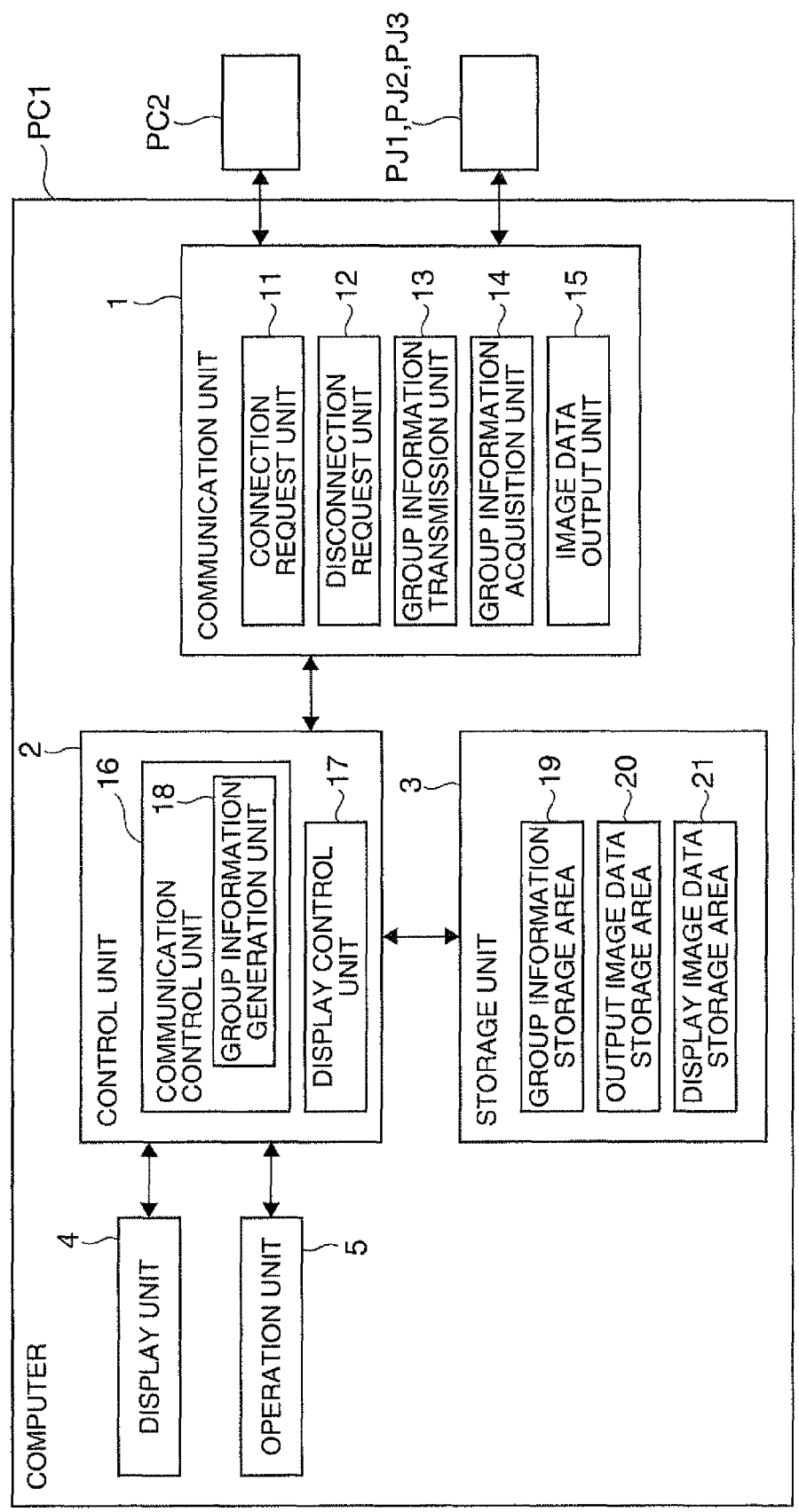
FIG. 2 is a block diagram illustrating the control configuration of a computer.

FIG. 2 is a block diagram illustrating the functional configuration of the computer PC1. The computer PC2 has the same configuration as that of the computer PC1 and the description thereof will not be repeated. The computer PC1, which corresponds to a general personal computer, includes a communication unit 1, a control unit 2, a storage unit 3, a display unit 4, and an operation unit 5. The communication unit 1 is realized mainly by a network interface and communicates with an apparatus connected to the network NW excluding the own apparatus. The control unit 2 is realized mainly by a CPU, a RAM, and a ROM and overall controls the computer PC1. The storage unit 3 is realized by a ROM or an HDD and stores information regarding the connection establishment with the plurality of projectors PJ1, PJ2, and PJ3 concurrently projecting images. The display unit is realized by a display and displays screens (see FIGS. 5A to 7C and FIG. 12) to show a connection operation for the plurality of projectors PJ1, PJ2, and PJ3. The operation unit 5 is realized by a keyboard or a mouse and is used for a user to perform the connection operation for the plurality of projectors PJ1, PJ2, and PJ3.

The communication unit 1 includes a connection request unit 11, a disconnection request unit 12, a group information transmission unit 13, a group information acquisition unit 14, and an image data output unit 15. A "group information reading unit" in the claims is realized by the group information acquisition unit.

The connection request unit 11 gives a connection request to the arbitrary projectors PJ1, PJ2, and PJ3 connected to the network NW. The disconnection request unit 12 gives a connection disconnecting request to the arbitrary projectors PJ1, PJ2, and PJ3 which have established the group connection with the computer PC1. The group information transmission unit 13 transmits up-to-date group information stored by the own apparatus having given the connection request and the disconnection request to the projectors PJ1, PJ2, and PJ3. The group information acquisition unit 14 acquires the group information from the projectors PJ1, PJ2, and PJ3 having the group information or the computer PC2. The image data output unit 15 outputs image data of output images to the projectors PJ1, PJ2, and PJ3 having established the connection.

The control unit 2 includes a communication control unit 16 controlling communication of the communication unit 1 and a display control unit 17 controlling displaying of the display unit 4.

The communication control unit 16 is mainly realized by a connection application connecting the own apparatus to the arbitrary projectors PJ1, PJ2, and PJ3 connected to the network NW and controls the connection and disconnection between the computer PC1 and the arbitrary projectors PJ1, PJ2, and PJ3. The communication control unit 16 includes a group information generation unit 18 generating the group information indicating the arbitrary projectors PJ1, PJ2, and PJ3 grouped and connected to the network NW. The group information includes a group name of a group, an apparatus ID of a computer PC belonging to the group, and an apparatus ID of a projector PJ belonging to the group (see FIG. 3). The group information generation unit 18 gives a group name (such as a "Group A") for the apparatus IDs of the projectors PJ1 and PJ2 and the apparatus ID of the own apparatus and generates the group information, when the projectors PJ1 and PJ2 are grouped and establish the group connection with the computer PC1. When the apparatuses belonging to the group are changed, the group information is also changed. That is, the group information is information indicating that an apparatus connects the group. The update of the group information will be described below.

The storage unit 3 includes a group information storage area 19 storing the group information, an output image data storage area 20 storing the image data of the output images output to the projectors PJ1, PJ2, and PJ3 having established the connection, and a display screen data storage area 21 storing screen data of the display screen displayed by the display unit 4.

FIG. 3 is a diagram illustrating the storage details of the group information storage area 19. As illustrated, the group information storage area 19 stores the group information generated by the group information generation unit 18 sequentially according to a group information generation time. The group information storage area 19 stores the group information in a non-rewritable and non-volatile manner. The group information stored in the group information storage area 19 is used as past group information at connection after the subsequent connection. The usage of the group information will be described below.

Figure 4:
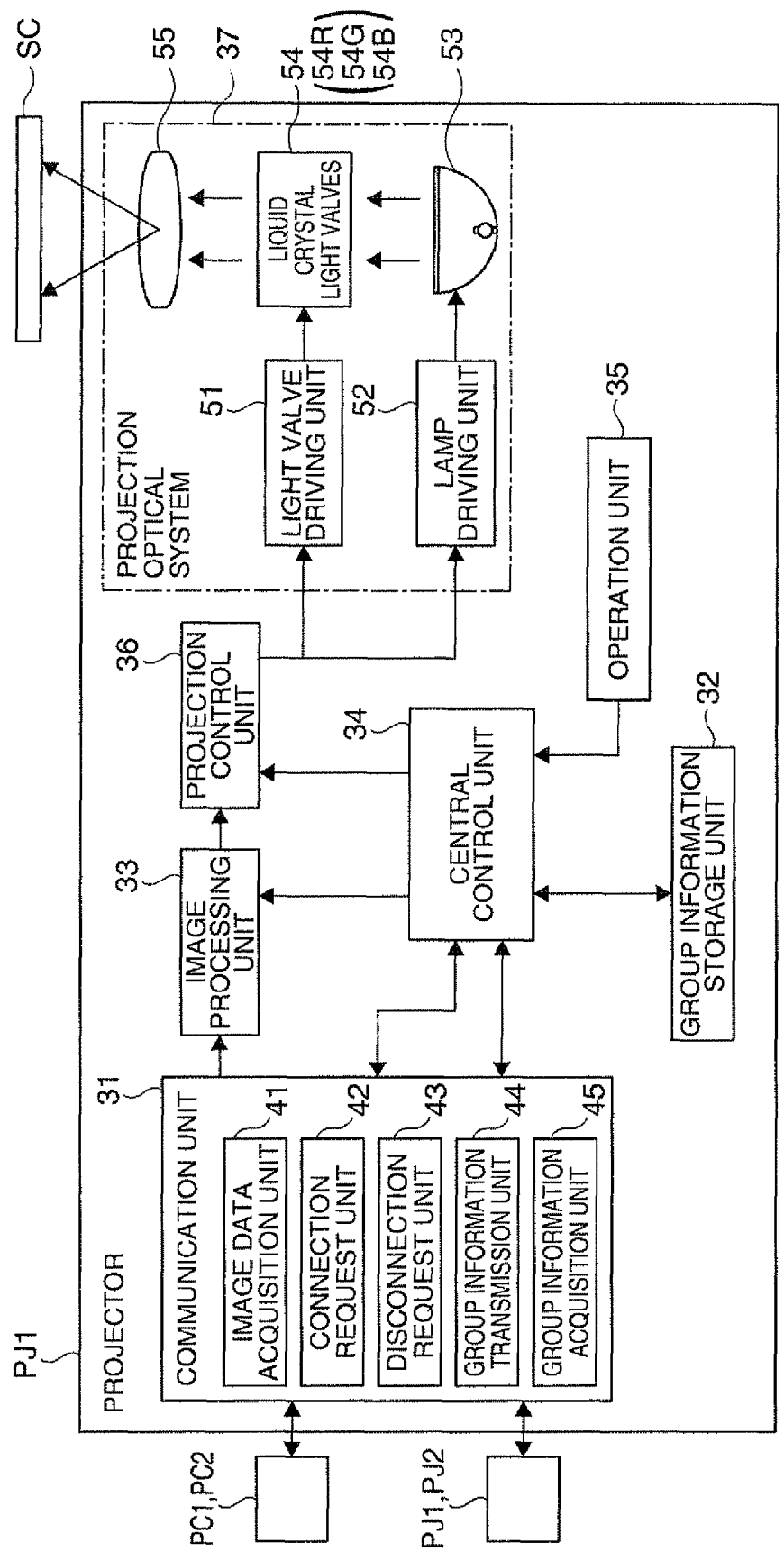
FIG. 4 is a block diagram illustrating the control configuration of a projector according to a first embodiment.

FIG. 4 is a block diagram illustrating the control configuration of the projector PJ1. The projectors PJ2 and PJ3 have the same configuration as that of the projector PJ1 and the description thereof will not be repeated. As illustrated, the projector PJ1 includes a communication unit 31, a group information storage unit 32, an image processing unit 33, a central control unit 34, an operation unit 35, a projection control unit 36, and a projection optical system 37.

The communication unit 31 communicates with apparatuses connected to the network NW excluding the own apparatus. The communication unit 31 includes an image data acquisition unit 41, a connection request unit 42, a disconnection request unit 43, a group information transmission unit 44, and a group information acquisition unit 45. The image data acquisition unit 41 acquires output image data from the computer PC1 or PC2. The connection request unit 42 gives a connection request to apparatuses connected to the network NW excluding the own apparatus. The disconnection request unit 43 gives a connection disconnecting request to the apparatuses which have been grouped and connected to the network NW excluding the own apparatus. The group information transmission unit 44 transmits up-to-date group information stored by the own apparatus to the apparatuses connected to the network NW excluding the own apparatus. The group information acquisition unit 45 acquires the group information from the projector PJ1, PJ2, or PJ3 or the computer PC2 having the group information.

The group information storage unit 32 stores the acquired group information in a rewritable manner. When a connection request is received from the computer PC not belonging to a group, the group information storage unit 32 adds and stores the apparatus ID of this computer PC in the group information. On the other hand, when receiving a connection disconnecting request from the computer PC belonging to the group, the group information storage unit 32 deletes the apparatus ID of this computer PC from the group information and stores the deletion.

The central control unit 34 overall controls the entire projector PJ. The operation unit 35 is used when a user performs various kinds of settings and operations and is realized by an operation panel (not shown) installed in the body of the projector PJ or a remote controller (not shown).

The image processing unit 33 performs predetermined image processing on the image data received by the image data acquisition unit 41 based on an image processing program stored in advance. The predetermined image processing includes keystone distortion correction processing, image quality adjustment processing, image size adjustment processing, gamma correction processing, and image synthesis processing.

The projection control unit 36 generates image data formed by the gray scales of all the pixels by deriving the gray scale values corresponding to the respective pixels of liquid crystal light valves 54 from the image processed by the image processing unit 33, and controls projection based on the image data.

The projection optical system 37 projects an image toward a screen SC. The projection optical system 37 includes a light valve driving unit 51, a lamp driving unit 52, a light source unit 53, the liquid crystal light valves 54 (54R, 54G, and 54B) corresponding to the three primary colors, and a projection lens 55. Each liquid crystal light valve 54 includes a liquid crystal panel in which liquid crystal is sealed between a pair of transparent substrates. In the inner surface of each transparent substrate, transparent electrodes applying a driving voltage to the liquid crystal are formed as pixels in minute regions, respectively, in a matrix form. The light valve driving unit 51 sets the light transmittance of the respective pixels by applying a driving voltage corresponding to the image data to the respective pixels of the liquid crystal light valves 54. That is, illumination light emitted from the light source unit 53 is separated into colored light of R, G, and B by a light separation optical system (not shown), and then passes through the liquid crystal light valves 54 for the respective colors to be modulated. The modulated image light is synthesized in the respective pixels by a light synthesis optical system (a dichroic prism or the like) (not shown) so that a color image is formed and the image light forming the color image is projected by the projection lens 55, so that the color image is projected on the screen SC. In addition, an extra high pressure mercury lamp, a metal halide lamp, a xenon lamp, or the like can be used as the light source unit 53. The invention is not limited to the discharge optical emission type lamp, but various kinds of self light-emitting devices such as a light-emitting diode, an organic EL device, a silicon light-emitting device, a laser diode, and the like may be used.

Next, a connection establishment method for the projector system SY will be described with reference to FIGS. 5A to 13. In FIGS. 5A to 7C, display screens of the computer PC1 are shown when connected and disconnected. FIGS. 5A to 5C are diagrams illustrating examples of connection screens displayed on the display unit 4 when the computer PC1 groups the projectors PJ1 and PJ2 and establishes the connection. As shown in FIG. 5A, the projectors PJ1 and PJ2 connected to the network are searched as connectable projectors and are displayed. When the projectors PJ1 and PJ2 (a plurality of projectors) are selected on the screen, a grouping button 72 appears on the lower portion of the screen, as shown in FIG. 5B. When the grouping button 72 is pressed down, as shown in FIG. 5C, "GROUP A" is displayed for a "CONNECTED PROJECTOR LIST" in the lower portion of the screen. When the connection button 71 is pressed down, the projectors PJ1 and PJ2 are grouped and establish connection with the computer PC1. Thereafter, the computer PC1 transmits the output image data stored in the storage unit 3 to the projectors PJ1 and PJ2 in response to an operation of the operation unit 5, so that an image is projected by the projectors PJ1 and PJ2.

Figure 6A:
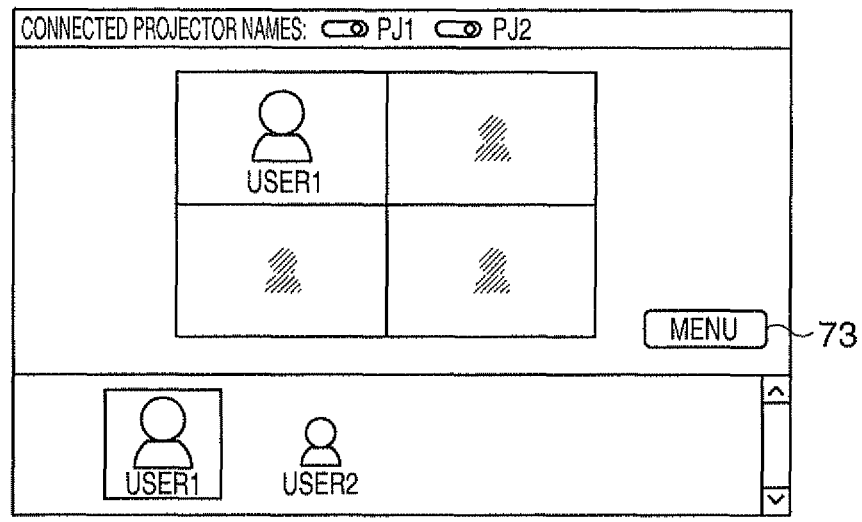
FIG. 6A is a diagram illustrating an example of a computer screen after group connection is established.
Figure 6B:
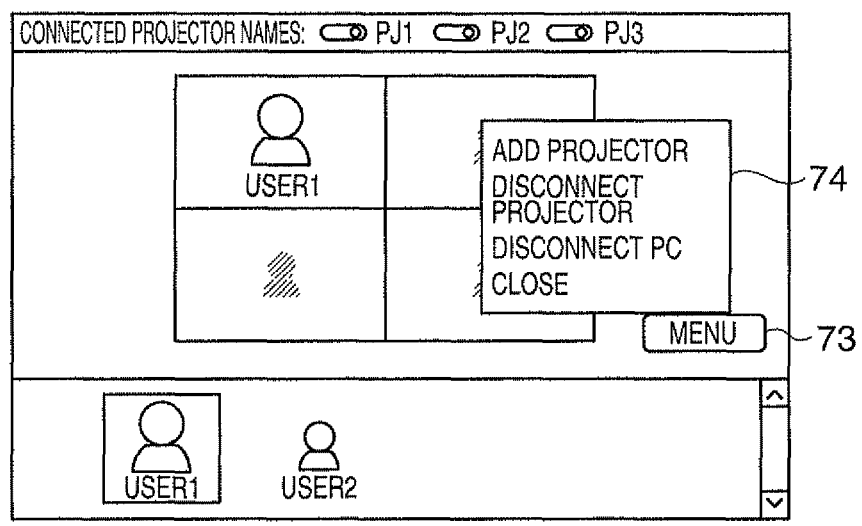
FIG. 6B is a diagram illustrating an example of a computer screen in which a menu screen is displayed.

FIG. 6A is a diagram illustrating a screen displayed on the display unit 4 of the computer PC1 when the connection button 71 is pressed down in FIG. 5C. The grouped projectors PJ1 and PJ2 are displayed in the upper portion of the screen. On the other hand, a user name "User 1" indicating the computer PC1 having established the connection is displayed in the center of the screen and a menu button 73 is displayed on the right side. User names "User 1" and "User 2" indicating that the computers PC1 and PC2 are connected to the network NW are displayed in the lower portion of the screen. When the menu button 73 in FIG. 6A is pressed down, as shown in FIG. 6E, a menu screen 74 is displayed above the menu button 73 in a sub-window form. On the menu screen 74, a selection item "ADD PROJECTOR" is displayed to add a new arbitrary projector PJ to the currently established connection, a selection item "DISCONNECT PROJECTOR" is displayed to disconnect the arbitrary projector PJ from the currently established connection, a selection item "DISCONNECT PC" is displayed to disconnect the arbitrary computer PC from the currently established connection, and a selection item "CLOSE" is displayed to finish the display of the menu screen 74.

FIG. 7A is a diagram illustrating a display screen when the selection item "ADD PROJECTOR" is selected among the selection items of the menu screen 74. As illustrated, the projector PJ3 connected to the network is newly searched and displayed as a connectable projector in addition to the projectors PJ1 and PJ2 currently grouped and connected, and thus an addition button 75 is displayed in the right lower portion of the screen. When the projector PJ3 is selected and the addition button 75 is pressed down on the screen, the projector PJ3 is added to the group and the connection between the computer PC1 and the projectors PJ1, PJ2, and PJ3 is established. Thereafter, the computer PC1 transmits the output image data stored in the storage unit 3 to the projectors PJ1, PJ2, and PJ3 in response to an operation of the operation unit 5, so that an image is projected by the projectors PJ1, PJ2, and PJ3.

FIG. 7B is a diagram illustrating a display screen when the group connection is established between the computer PC1 and the projectors PJ1, PJ2, and PJ3 and when the selection item "DISCONNECT PROJECTOR" is selected among the selection items of the menu screen 74. As illustrated, the projectors PJ1, PJ2, and PJ3 currently grouped and connected are displayed and a disconnection button 76 is displayed in the right lower portion of the screen. For example, when the projector PJ3 is selected and the disconnection button 76 is pressed down, the projector PJ3 is excluded from the group and the projector PJ3 is disconnected from the established connection.

FIG. 7C is a diagram illustrating a display screen when the computers PC1 and PC2 and the projectors PJ1, PJ2, and PJ3 are grouped and connected and when the selection item "DISCONNECT PC" is selected among the selection items of the menu screen 74. As illustrated, the User 1 and User 2 indicating the currently connected computers PC1 and PC2 are displayed and the disconnection button 76 is displayed in the right lower portion of the screen. When the computer PC1 is selected and the disconnection button 76 is pressed down on the screen, the computer PC1 is excluded from the group and the computer PC1 is disconnected from the established connection. In this embodiment, the computers PC excluding the own apparatus can be disconnected. Thus, it is possible to deal with neglection of disconnection of the computer PC excluding the own apparatus, thereby managing traffic. Moreover, by selecting and disconnecting both of the computers PC1 and PC2, it is possible to disconnect the entire established connection, that is, release the group connection. Thus, since the entire disconnection of the connection can be performed just by the operation of one arbitrary computer PC1, convenience can be achieved when the plurality of computers PC and projectors PJ are connected to each other. Moreover, an item releasing the group connection may be added to the menu screen 74.

In FIGS. 8A to 12, an operation of each apparatus is shown when connection and disconnection are performed in the projector system SY. FIG. 8A is a diagram illustrating the operations of the respective apparatuses when the computer PC1 and the projectors PJ1 and PJ2 are grouped and connected. The computer PC1 groups the projectors PJ1 and PJ2 connected to the network NW and generates the group information. In this case, the group information is "Group A: PC1, PJ1, and PJ2", as illustrated. The computer PC1 transmits a connection request and the group information to the projectors PJ1 and PJ2. The projectors PJ1 and PJ2 receiving the connection request and the group information each transmit a connection completion notification to the computer PC1. Then, the connection between the computer PC1 and the projectors PJ1 and PJ2 is established. For example, when the connection with the projector PJ2 fails, the computer PC1 having transmitted the connection request transmits new group information "Group A: PC1, PJ1" to the projector PJ2.

FIG. 8B is a diagram illustrating the operations of the respective apparatuses when a new computer PC2 is added to the established group connection in FIG. 8A. In this case, the computer PC1 and the projectors PJ1 and PJ2 grouped and connected to each other maintain the group information. The computer PC2 transmits the connection request to one arbitrary projector PJ1 belonging to the group. The projector PJ1 receiving the connection request transmits a connection completion notification and transmits the maintained group information to the computer PC2. At this time, the projector PJ1 adds the apparatus ID "PC2" of the computer PC2 to the group information maintained by the projector PJ1 and transmits the group information to the computer PC1. Then, referring to the maintained group information, the projector PJ1 transmits a connection request for connection of the computer PC2 to the projector PJ2 belonging to the group excluding the own apparatus. Then, the projector PJ2 receiving the connection request transmits a connection completion notification to the computer PC2 in response to the connection request. At this time, the projector PJ2 adds the apparatus ID of the computer PC2 to the group information maintained by the projector PJ2. Then, the projector PJ1 transmits the group information in which the computer PC2 is added, to the computer PC1.

Thus, it is possible to add the new computer PC2 to the group connection just by giving the connection request from the computer PC2 to the one arbitrary projector PJ1 belonging to the group. Moreover, the projector PJ1 having received the connection request transmits the connection request to another projector PJ2 and transmits the group information, in which the computer PC2 is added, to the computer PC1. Therefore, the apparatuses belonging to the group can maintain the up-to-date group information to which all of the apparatuses forming the current group are reflected.

Figure 9:
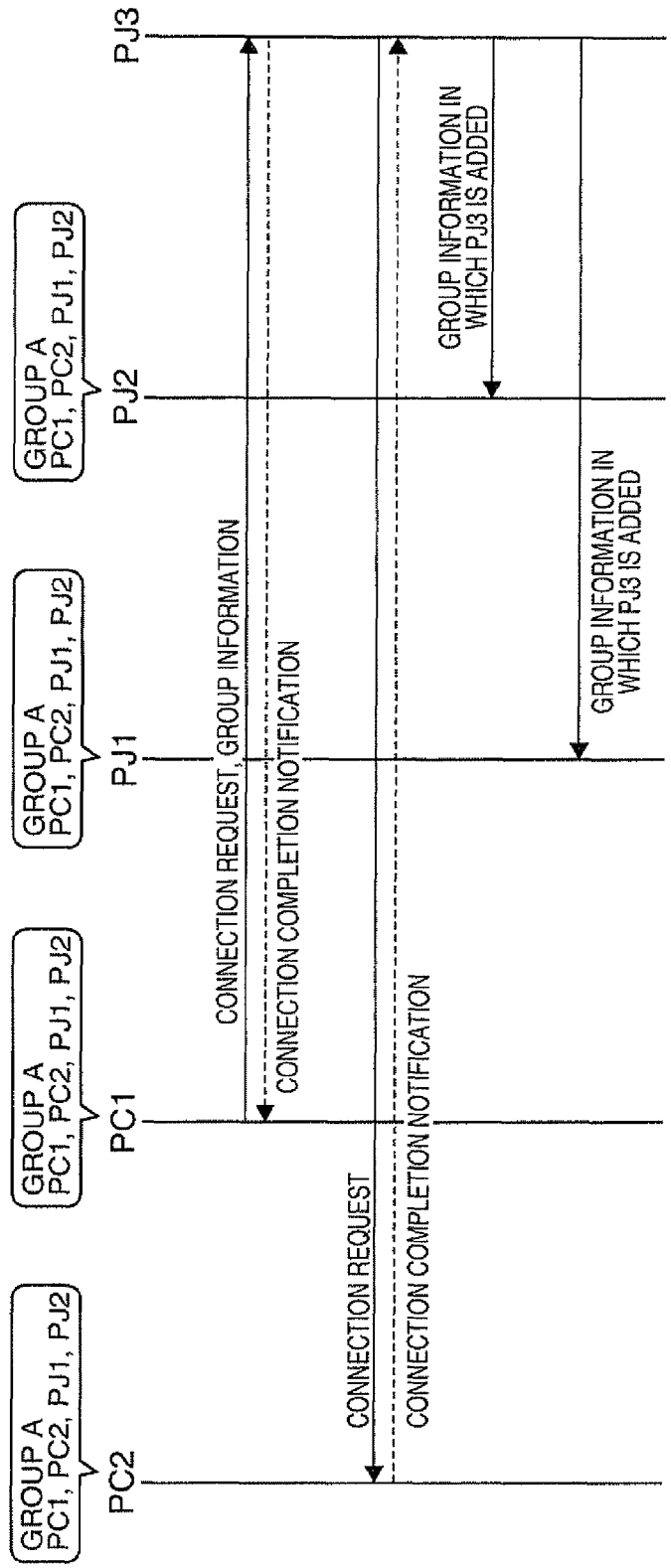
FIG. 9 is a diagram illustrating the operations of the respective apparatuses when a new projector is added to the group connection.

FIG. 9 is a diagram illustrating the operations of the respective apparatuses when a new projector PJ3 is added to the group connection. In this case, the computers PC1 and PC2 and the projectors PJ1 and PJ2 belonging to the group connection maintain the group information. First, the computer PC1 transmits a connection request to the projector PJ3 to be added and transmits the group information in which the apparatus ID of the projector PJ3 is added. The projector PJ3 having received the connection request transmits a connection completion notification to the computer PC1. In addition, referring to the group information received from the computer PC1, the projector PJ3 transmits a connection request for connection with the own apparatus to the computer PC2. The computer PC2 having received the connection request transmits the connection completion notification to the projector PJ3. At this time, the computer PC2 may add the apparatus ID of the projector PJ3 to the group information maintained by the own apparatus or may transmit the group information to the computer PC2 together with the connection request. Then, referring to the group information, the projector PJ3 transmits the group information, in which the projector PJ3 is added, to the projectors PJ1 and PJ2 belonging to the group excluding the own apparatus.

Thus, an arbitrary projector PJ can be added to the group connection, while the connection state of the group connection is maintained. Moreover, the connection with all of the computers PC belonging to the group can be established just by giving the connection request from one arbitrary computer PC1 to the desired projector PJ3. Furthermore, all of the apparatuses can recognize that the projector PJ3 has been added to the group connection, just by transmitting the up-to-date group information from the added projector PJ3 to the apparatuses belonging to the group excluding the own apparatus.

Figure 10:
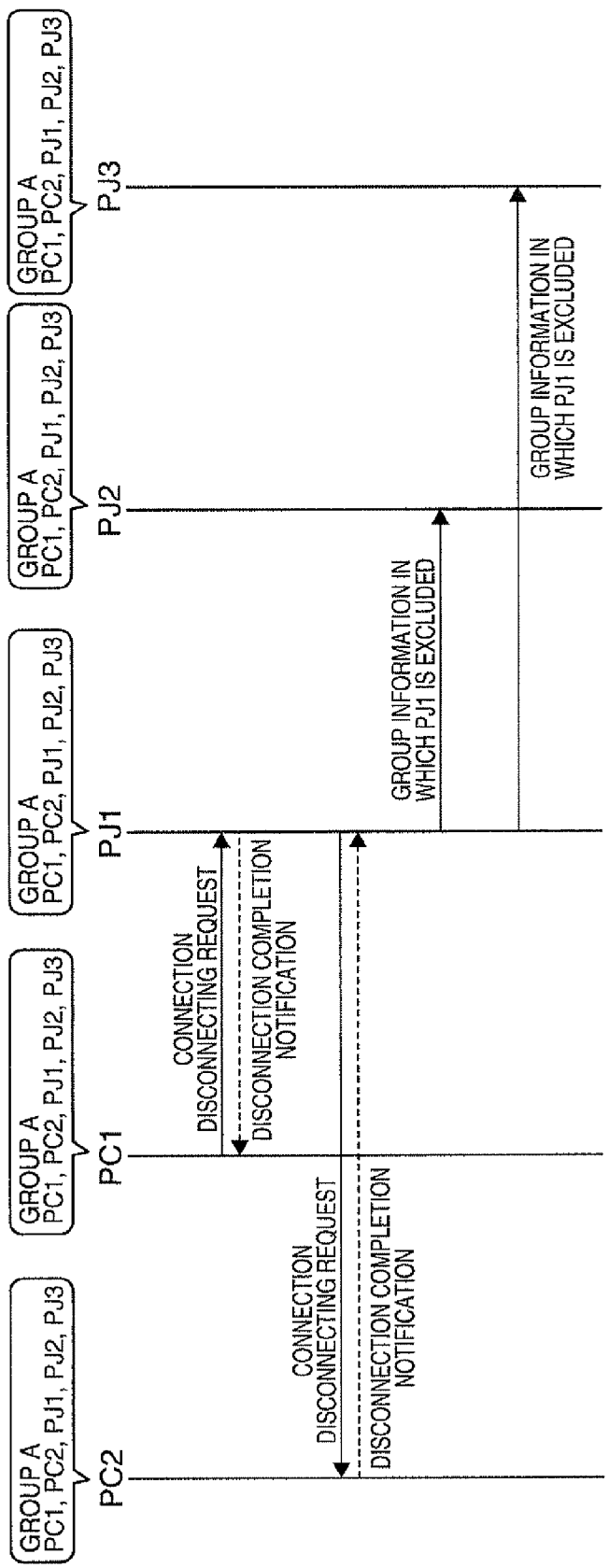
FIG. 10 is a diagram illustrating the operations of the respective apparatuses when a projector is disconnected from the group connection.

FIG. 10 is a diagram illustrating the operations of the respective apparatuses when an arbitrary projector PJ1 is disconnected from the established group connection. In this case, the computers PC1 and PC2 and the projectors PJ1, PJ2, and PJ3 belonging to the group connection maintain the group information. First, the disconnection request unit 12 of the computer PC1 transmits a connection disconnecting request to the projector PJ1 to be disconnected. The projector PJ1 having received the connection disconnecting request transmits a disconnection completion notification to the computer PC1. In addition, referring to the maintained group information, the projector PJ1 transmits the connection disconnecting request to the computer PC2 which does not receive the connection disconnecting request among the computers PC belonging to the group. On the other hand, the computer PC2 having received the connection disconnecting request transmits a disconnection completion notification to the projector PJ1. In addition, referring to the group information, the group information transmission unit 44 of the projector PJ1 transmits the group information in which the projector PJ1 is excluded, to the projectors PJ2 and PJ3 belonging to the group excluding the own apparatus.

Thus, the connection of the arbitrary projector PJ1 can be disconnected, while the group connection is maintained. Moreover, it is possible to disconnect the projector PJ1 from all of the computers PC belonging to the group to which the projector PJ is connected, just by giving the connection disconnecting request from the disconnection request unit 12 of one arbitrary computer PC1 belonging to the group to the projector PJ1 desired to be disconnected. Furthermore, the projectors PJ2 and PJ3 can recognize that the projector PJ1 has been disconnected from the group connection, just by transmitting the group information from the group information transmission unit 44 of the projector PJ1 having received the connection disconnecting request to the projectors PJ2 and PJ3 excluding the own apparatus.

Figure 11:
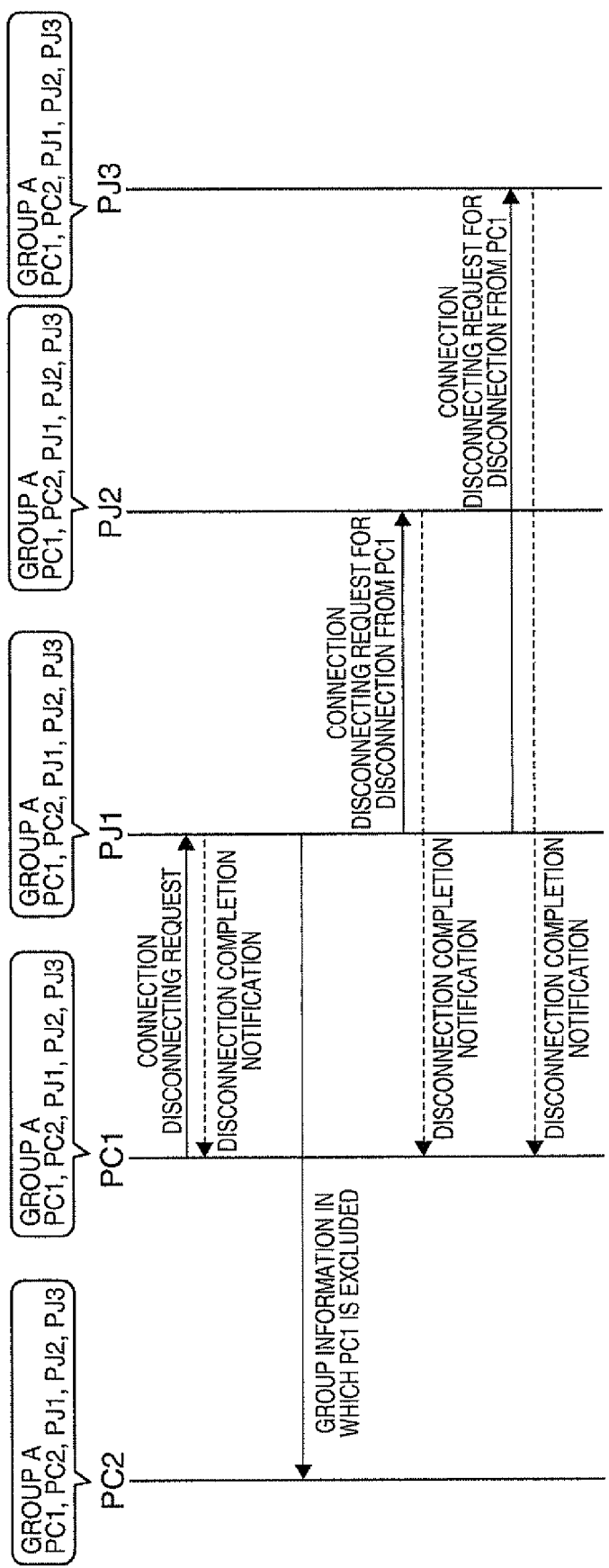
FIG. 11 is a diagram illustrating the operations of the respective apparatuses when a computer is disconnected from the group connection.

FIG. 11 is a diagram illustrating the operations of the respective apparatuses when an arbitrary computer PC1 is disconnected from the group connection. In this case, the computers PC1 and PC2 and the projectors PJ1, PJ2, and PJ3 belonging to the group connection maintain the group information. First, the disconnection request unit of the computer PC1 to be disconnected transmits a connection disconnecting request to an arbitrary projector PJ1 belonging to the group. The projector PJ1 having received the connection disconnecting request transmits a disconnection completion notification to the computer PC1. In addition, the group information transmission unit 44 of the projector PJ1 transmits the group information to the computer PC2 excluding the computer PC1. In addition, referring to the maintained group information, the disconnection request unit 43 transmits the connection disconnecting request for disconnection from the computer PC1 to the projectors PJ2 and PJ3 belonging to the group excluding the own apparatus. On the other hand, the projectors PJ2 and PJ3 having received the connection disconnecting request for disconnection from the computer PC1 transmit the disconnection completion notification to the computer PC1.

Thus, the connection of the arbitrary computer PC1 can be disconnected, while the group connection is maintained. Moreover, it is possible to disconnect the computer PC1 from all of the projectors PJ belonging to the group to which the computer PC1 is connected, just by giving the disconnection request from the disconnection request unit 12 of the computer PC1 desired to be disconnected to one arbitrary projector PJ1 belonging to the group. Furthermore, the computer PC2 can recognize that the computer PC1 has been disconnected from the group connection, just by transmitting the group information from the group information transmission unit 44 of the projector PJ1 having received the disconnection request to the computer PC2 excluding the computer PC1.

Figure 12:
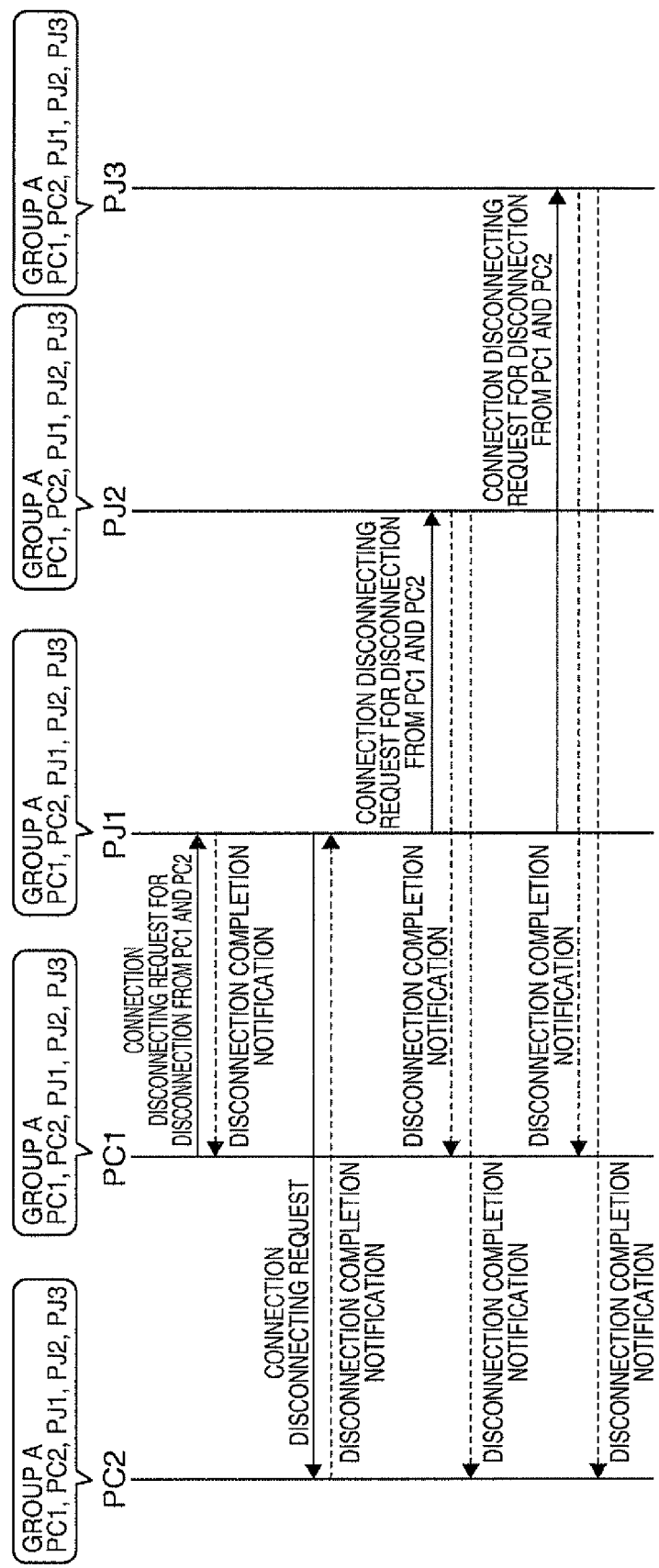
FIG. 12 is a diagram illustrating the operations of the respective apparatuses when the group connection is released.

FIG. 12 is a diagram illustrating the operations of the respective apparatuses when the group connection is released. The process of releasing the group connection is performed when all of the PCs are selected on a PC disconnection screen shown in FIG. 7C. In this case, the computers PC1 and PC2 and the projectors PJ1, PJ2, and PJ3 belonging to the group connection maintain the group information. First, the disconnection request unit 12 of the computer PC1 transmits a connection disconnecting request for disconnection from the own apparatus and the computer PC2 to one arbitrary projector PJ1 belonging to the group. The projector PJ1 having received the connection disconnecting request transmits the connection disconnecting completion request to the computers PC1 and PC2. In addition, referring to the maintained group information, the disconnection request unit 43 of the projector PJ1 transmits the connection disconnecting request for disconnection from the computers PC1 and PC2 to the projectors PJ2 and PJ3 belonging to the group excluding the own apparatus. On the other hand, the projectors PJ2 and PJ3 having received the connection disconnecting request for disconnection from the computers PC1 and PC2 transmit a disconnection completion notification to the computers PC1 and PC2.

Thus, it is possible to release the group connection, just by giving the connection disconnecting request from one arbitrary computer PC1 belonging to the group to one arbitrary projector PJ1 belonging to the group.

FIG. 13A is a diagram illustrating a display screen displayed after the group connection is released. In the middle of the screen, a message screen 77 is displayed in a sub-window form to confirm whether the group information is preserved. A message asking whether to preserve the group information regarding the immediately previous established group connection and a choice ("Yes" and "No") indicating a response are displayed in the message screen 77. When the choice "Yes" is selected, the group information regarding the immediately previous established group connection is stored in the group information storage area 19 of the storage unit 3 in a non-volatile manner. On the other hand, when the choice "No" is selected, the group information is not preserved and deleted.

FIG. 13B is a diagram illustrating a display screen displayed in subsequent group connection when the group information is stored in the group information storage area 19. The information regarding the previously established group connection is reproduced in the screen. A currently unconnected apparatus, such as an apparatus which is not connected to the network or turned off, is displayed in a mesh form among the apparatuses connected to the previous group. Moreover, when the previous group connection is not used, a normal connection screen as in FIG. 5A is displayed by an operation for a selection screen (not shown).

Thus, the group information can be used the next time since the computer PC stores the group information regarding the previously established group connection in a non-volatile manner. For example, when the group connection is intended to be established like the previous apparatus configuration, it is not necessary to search the projectors PJ again and thus convenience is achieved. The group information may be stored in a non-volatile manner in the group information storage unit 32 of the projector PJ and the computer PC may acquire the group information stored in the projector PJ when the connection is established next time. In this case, as shown in FIG. 13C, the projector list corresponding to the group information stored in the projector PJ is displayed. The projector PJ preferably stores the group information in a non-volatile manner.

The computer PC may acquire the group information regarding the configurations of the apparatuses excluding the current own apparatus when the group connection is established, and may display the display screen indicating the apparatuses belonging to the group in the form as in FIG. 13B. Thus, the respective apparatuses participating in the group connection, particularly, the computer PC, can be confirmed before the apparatuses participate in the group connection.

In the above-described embodiment, processing starts by a connection request from all of the computers PC. However, the projector PJ belonging to the group may give a connection request to an arbitrary computer PC.

A plurality of the above-described groups including a plurality of computers and projectors may be formed and a main computer may give a connection request and transmit the group information regarding each of the groups to one arbitrary computer belonging to each of the groups. In this case, each of the computers receiving the connection request and the group information gives a connection request to the plurality of projectors of the group to which the own apparatus belongs. Thus, it is possible to easily establish the connection with the plurality of projectors forming the plurality of groups, just by giving the connection request from the main computer to one arbitrary computer of each of the groups.

Second Embodiment

Hereinafter, a second embodiment of the invention will be described with reference to FIGS. 14 to 16D. The same reference numerals are given to the same constituent elements as those of the first embodiment and the detailed description will not be repeated.

Figure 14:
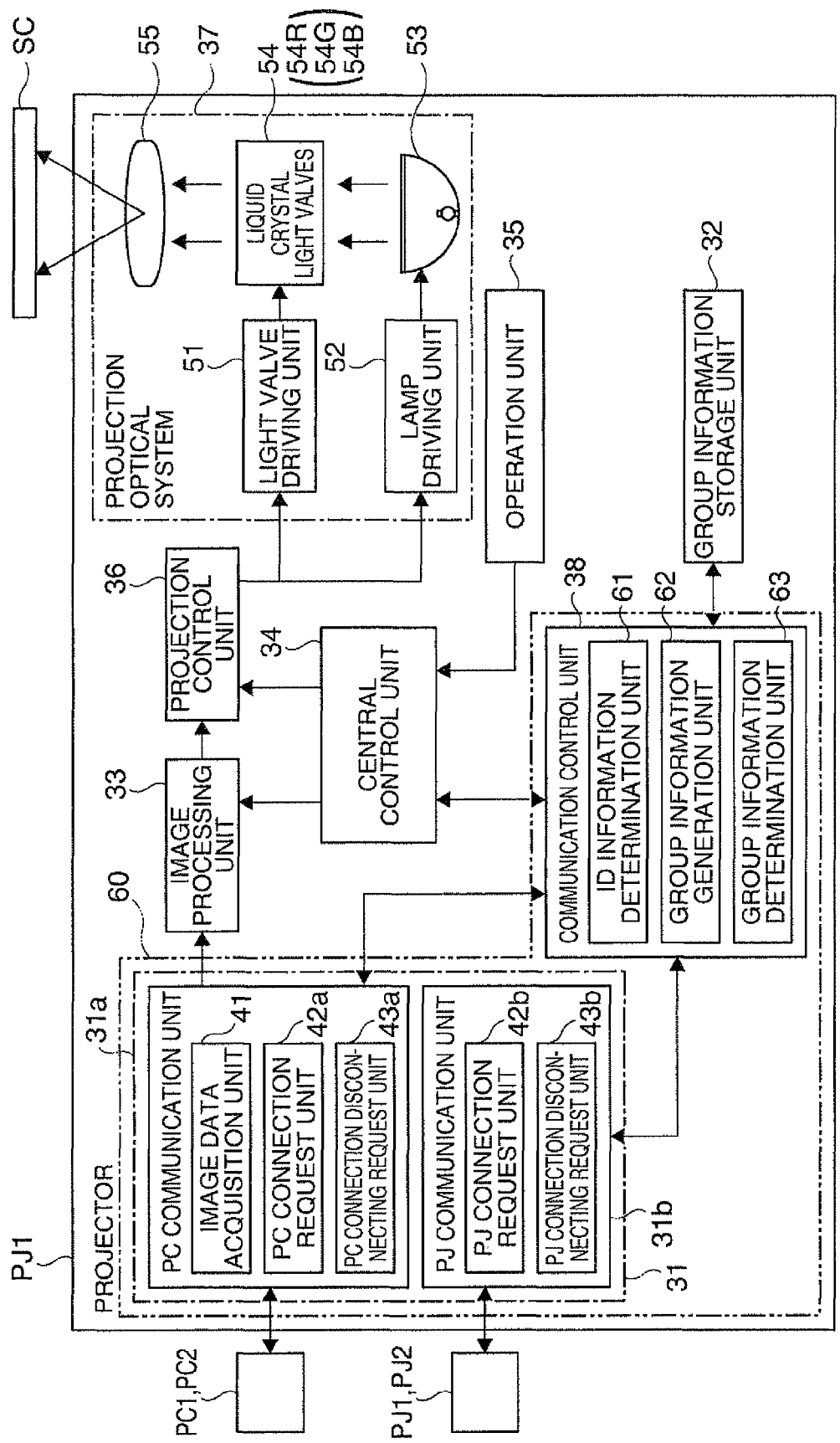
FIG. 14 is a block diagram illustrating the control configuration of a projector according to a second embodiment.

FIG. 14 is a block diagram illustrating the configuration of a projector PJ1 according to this embodiment. Both projectors PJ2 and PJ3 have the same configuration. As shown in FIG. 14, the projector PJ1 includes a connection establishment unit 60 establishing connection with apparatuses connected to a network NW excluding the own apparatus, a group information storage unit 32, an image processing unit 33, a central control unit 34, an operation unit 35, a projection control unit 36, and a projection optical system 37.

The connection establishment unit 60 includes a communication unit 31 communicating with the apparatuses connected to the network NW excluding the own apparatus and a communication control unit 38 controlling the communication.

The communication unit 31 includes a PC communication unit 31a communicating with a plurality of computers PC (PC1, . . . , and PCn) connected to the network NW and a PJ communication unit 31b communicating a plurality of projectors PJ (PJ2, . . . , and PJm) excluding the own apparatus.

The PC communication unit 31a includes an image data acquisition unit 41 receiving image data from the computers PC, a PC connection request unit 42a transmitting and receiving connection information to and from the computers PC, and a PC connection disconnecting request unit 43a transmitting and receiving disconnection information. On the other hand, the PJ communication unit 31b includes a PJ connection request unit 42b transmitting and receiving the connection information to and from the projectors PJ excluding the own apparatus and a PJ connection disconnecting request unit 43b transmitting and receiving the disconnection information. The connection information includes a connection request, a connection completion notification, an apparatus ID, and a group ID. The disconnection information includes a connection disconnecting request, a disconnection completion notification, an apparatus ID, and a group ID.

The image data acquisition unit 41 receives the image data from the computers PC and is realized by an interface receiving RGB signals output from the computers PC.

The PC connection request unit 42a receives an apparatus ID "PC1" and a connection request transmitted from the computers PC and transmits an apparatus ID "PJ1" of the own apparatus and a connection completion notification to the computers PC. When the computer PC groups the plurality of projectors PJ (for example, PJ1, PJ2, and PJ3) and transmits the connection request, the PC connection request unit 42a also receives apparatus IDs "PJ1", "PJ2", and "PJ3" of the grouped projectors PJ.

The PC connection disconnecting request unit 43a receives the apparatus ID "PC1" and the connection disconnecting request transmitted from the computer PC and transmits the apparatus ID "PJ1" and the disconnection completion notification of the own apparatus to the computer PC. The PC connection disconnecting request unit 43a transmits the apparatus ID "PJ1" and the connection disconnecting request to another computer PC (for example, PC2) in a connected state based on an instruction from a communication control unit 38 described below.

When the PC connection request unit 42a receives the connection request and the apparatus IDs of the plurality of projectors PJ from the computer PC, the PJ connection request unit 42b transmits the apparatus ID "PC1" of the computer PC and the connection request to the projectors PJ (PJ2 and PJ3) excluding the own apparatus receiving the ID based on the instruction of the communication control unit 38. On the contrary, when receiving the apparatus ID "PC1" of the computer PC and the connection request from the projectors PJ excluding the own apparatus, the PJ connection request unit 42b transmits the apparatus ID of the own apparatus and the connection completion notification to the computer PC1 corresponding to the received apparatus ID "ID".

The PJ connection disconnecting request unit 43b transmits the apparatus ID "PC1" of the computer PC and the connection disconnecting request to the projectors PJ (PJ2 and PJ3) excluding the own apparatus based on the instruction from the communication control unit 38 described below. On the contrary, when receiving the apparatus ID "PC1" of the computer PC and the connection disconnecting request from the projectors PJ excluding the own apparatus, the PJ connection disconnecting request unit 43b transmits the apparatus ID of the own apparatus and the disconnection completion notification to the computer PC1 corresponding to the received apparatus ID.

The communication control unit 38 includes an ID information determination unit 61 determining whether the PC connection request unit 42a receives the apparatus ID of the projectors PJ excluding the own apparatus from the computer PC, a group information generation unit 62 generating group information from the apparatus ID received from the computer PC by the PC connection request unit 42a, and a group information determination unit 63 determining whether the group information is stored in the group information storage unit 32 described below. The group information determination unit 63 also determines whether the apparatus IDs of the plurality of computers PC are included in the group information. This is because when the connection disconnecting request is received from an arbitrary computer PC, the connection disconnecting request is given to all of the computers PC and the projectors PJ in the connection state.

When the PC connection request unit 42a receives the apparatus ID of the computer PC and the received ID includes the apparatus ID of the projectors PJ excluding the own apparatus, the group information generation unit 62 gives the apparatus ID "PC1" of the computer PC, the apparatus IDs "PJ2 and PJ3" of the projectors PJ (for example, PJ2 and PJ3) excluding the own apparatus, the apparatus ID "PJ1" of the own apparatus, and the group ID "A" to form a group and generates group information "Group A: PC1, PJ1, PJ2, and PJ3". In addition, when the PC connection request unit 42a receives the apparatus ID from another computer PC, the group information generation unit 62 adds the apparatus ID "PC2" of another computer PC to the generated group information. In this case, the group information is "Group A: PC1, PC2, PJ1, PJ2, and PJ3".

The group information generation unit 62 generates the group information, only when the group information is not stored in the group information storage unit 32. That is, in this embodiment, the group information storage unit 32 is configured not to store the plurality of group information. Even when the group information is not stored in the group information storage unit 32 and when the apparatus IDs of the projectors PJ excluding the own apparatus is not included in the apparatus ID received from the computer PC by the PC connection request unit 42a, the group information is not generated.

The group information storage unit 32 stores the group information generated by the group information generation unit 62 in a rewritable manner. The group information stored in the group information storage unit is configured to be deleted when the connection disconnecting request is received from the PC connection disconnecting request unit 43a and the PJ connection disconnecting request unit 43b.

The central control unit 34, the operation unit 35, and the image processing unit 33, the projection control unit 36, and the projection optical system 37 each have the same configuration as that of the first embodiment.

Figure 15:
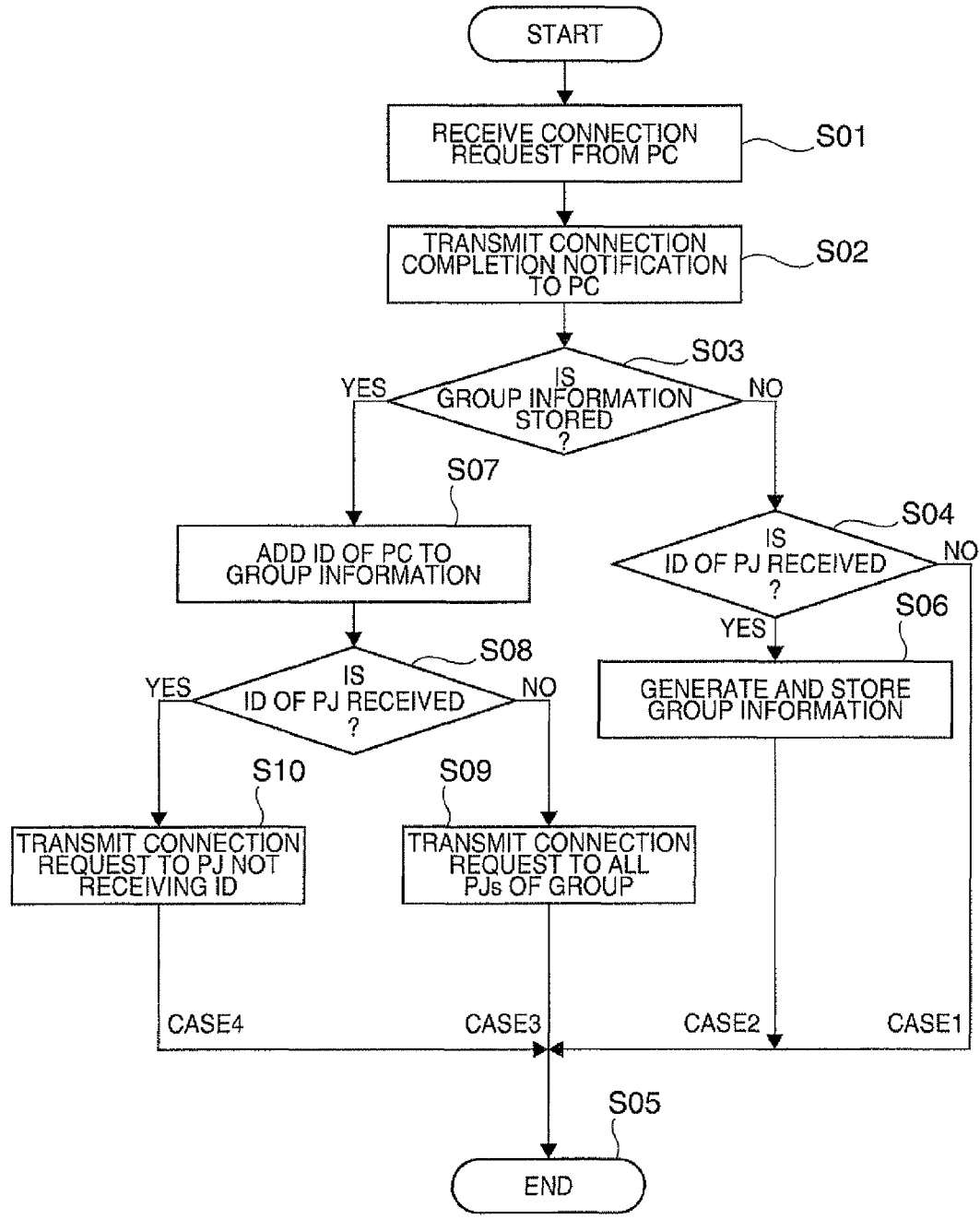
FIG. 15 is a flowchart illustrating a connection operation of a projector.

Next, a connection operation (connection establishment method) of the projector PJ1 according to this embodiment will be described with reference to FIG. 15. When the PC connection request unit 42a receives the apparatus ID and the connection request from an arbitrary computer PC (PC1) (S01), the projector PJ (the communication control unit 38) transmits the apparatus ID of the own apparatus and the connection completion notification to the computer PC1 having received the connection request (S02). Then, the group information determination unit 63 determines whether the group information is stored in the group information storage unit 32 (S03).

When the group information is not stored (NO in S03), the ID information determination unit 61 determines whether the apparatus IDs of the projectors PJ excluding the own apparatus are received from the computer PC1 (S04). When the apparatus IDs of the projectors PJ excluding the own apparatus are not received (NO in S04), the connection operation ends (S05). The flow up to this step is referred to as CASE 1 (see FIG. 16A).

On the other hand, when the apparatus IDs (for example, "PJ2" and "PJ3") of the projectors PJ excluding the own apparatus are received from the computer PC1 (YES in S04), the group information generation unit 62 gives the group ID "A" to the computer PC1, the projectors PJ1 and PJ2, and the apparatus ID of the own apparatus, generates group information "Group A: PC1, PJ1, PJ2, and PJ3", stores the group information in the group information storage unit 32 (S06), and terminates the connection operation (S05). The flow up to this step is referred to as CASE 2 (see FIG. 16B).

When the group information is stored (YES in S03), the group information generation unit 62 adds the apparatus ID of the computer PC1 to the stored group information (S07). Then, the ID information determination unit 61 determines whether the apparatus IDs of the projectors PJ excluding the own apparatus is received from the computer PC1 (S08). When the apparatus IDs of the projectors PJ excluding the own apparatus is not received (NO in S08), the apparatus ID of the computer PC1 and the connection request are transmitted to the projectors PJ2 and PJ3 corresponding to all of the apparatus IDs included in the group information excluding the own apparatus (S09), and then the connection operation ends (S05). The flow up to this step is referred to as CASE 3 (see FIG. 16C).

On the other hand, when the apparatus ID (for example, "PJ2") of the projector PJ excluding the own apparatus is received from the computer PC1 (YES in S08), the apparatus ID of the computer PC1 and the connection request are transmitted only to the projector PJ3 excluding the projector PJ2 corresponding to the received apparatus ID (S10), and the connection operation ends (S05). The flow up to this step is referred to as CASE 4 (see FIG. 16D).

Next, a connection operation between the computer PC1 and the projectors PJ1, PJ2, and PJ3 will be described with reference to FIGS. 16A to 16D. FIGS. 16A to 16D are diagrams illustrating the operations of the respective apparatuses in CASE 1, CASE 2, CASE 3, and CASE 4 of FIG. 15. An arrow indicated by a solid line in FIGS. 16A to 16D represents a "connection request" and an arrow indicated by a dotted line represents a "connection completion notification".

Figure 16A:
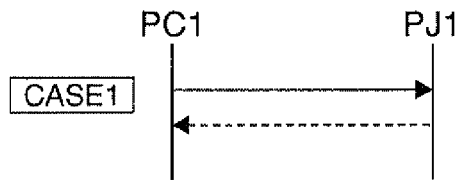
FIG. 16A is a diagram illustrating the connection operation between the apparatuses in CASE 1 of FIG. 15.
Figure 16B:
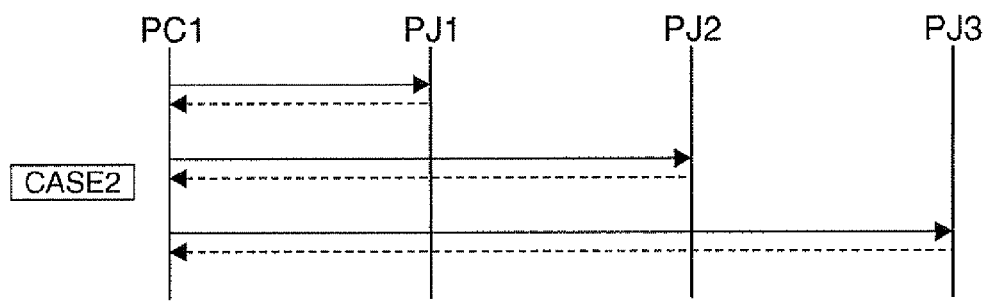
FIG. 16B is a diagram illustrating the connection operation between the apparatuses in CASE 2 of FIG. 15.

When the group information is not stored and when the apparatus ID "PC1" and the connection request are transmitted from the computer PC1 to the projector PJ1 in CASE 1, as shown in FIG. 16A, the projector PJ1 transmits the apparatus ID "PJ1" and the connection completion notification to the computer PC1. When the apparatus ID "PC1", :"PJ1", "PJ2", and "PJ3" and the connection request are transmitted from the computer PC1 to the projectors PJ1, PJ2, and PJ3 in CASE 2, as shown in FIG. 16B, the projectors PJ1, PJ2, and PJ3 each transmit the apparatus ID of the own apparatus and the connection completion notification to the computer PC1. At this time, the group information "Group A: PC1, PJ1, PJ2, PJ3" is generated and stored in the projectors PJ1, PJ2, and PJ3.

Figure 16C:
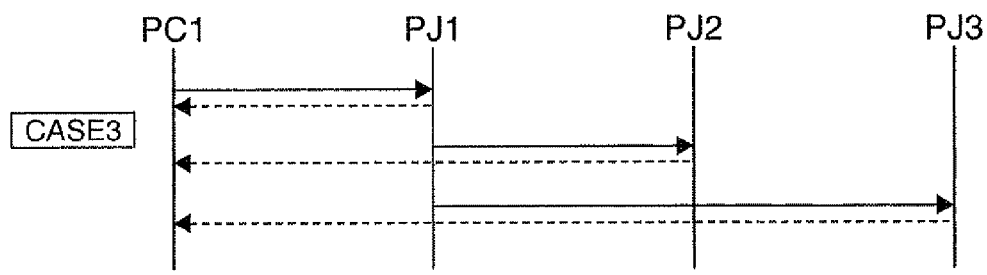
FIG. 16C is a diagram illustrating the connection operation between the apparatuses in CASE 3 of FIG. 15.

When the group information "Group A: PC1, PJ1, PJ2, PJ3" is stored and when the apparatus ID "PC1" and the connection request are transmitted from the computer PC1 to the projector PJ1 in CASE 3, as shown in FIG. 16C, the projector PJ1 transmits the apparatus ID "PJ1" and the connection completion notification to the computer PC1 and transmits the apparatus ID "PC1" and the connection request to the projectors PJ2 and PJ3 belonging to the group. The projectors PJ2 and PJ3 having received the apparatus ID "PC1" and the connection request from the projector PJ1 each transmit the apparatus ID "PJ2" or "PJ3" and the connection completion notification to the computer PC1.

This flow is the same as the flow of CASE 2 in which the group information is generated, and then another computer PC (for example, PC2) transmits the connection request to the projector PJ1. That is, the computer PC subsequent to the second or later connected computer can be connected to all of the projectors PJ (for example, PJ2 and PJ3) of the group, when just giving the connection request only to one arbitrary projector PJ (for example, PJ1) of the group.

Figure 16D:
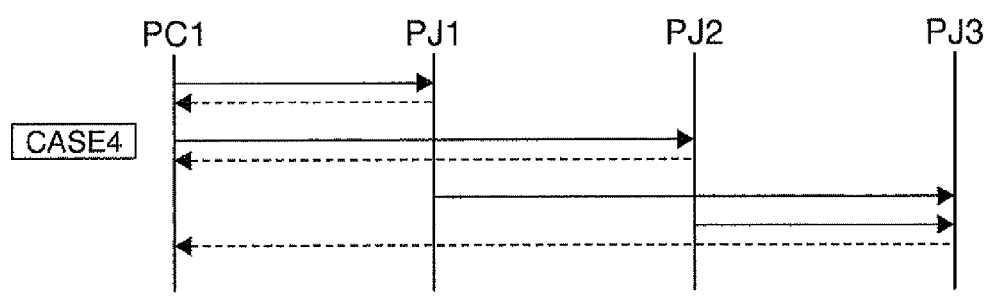
FIG. 16D is a diagram illustrating the connection operation between the apparatuses in CASE 4 of FIG. 15.

When the apparatus IDs "PC1", :PJ1", and "PJ2" and the connection request are transmitted from the computer PC1 to the projectors PJ1 and PJ2 in CASE 4, as shown in FIG. 16D, the projector PJ1 transmits the apparatus ID "PC1" and the connection completion notification to the computer PC1. In addition, the projector PJ1 does not transmit the connection request to the projector PJ2 to which the apparatus ID is transmitted from the computer PC1 and transmits the apparatus ID "PC1" and the connection request only to the projector PJ3 to which the apparatus ID is not transmitted. Likewise, the projector PJ2 transmits the apparatus ID "PJ2" and the connection completion notification to the computer PC1. In addition, the projector PJ2 does not transmit the connection request to the projector PJ1 to which the apparatus ID is transmitted from the computer PC1 and transmits the apparatus ratus ID "PC1" and the connection request only to the projector PJ3 to which the apparatus ID is not transmitted. Thus, it is possible to prevent the connection request from being repeatedly given to the projectors PJ1 and PJ2.

However, the priority order is attached to the projectors PJ of the group and the group information is stored when the connection request is repeated given from the other projectors PJ (PJ1 and PJ2) to the projector PJ3. When the connection request is simultaneously transmitted from the computer PC to the plurality of projectors PJ, only the projector PJ having the higher priority order may transmit the connection request to the other projector PJ.

Figure 17:
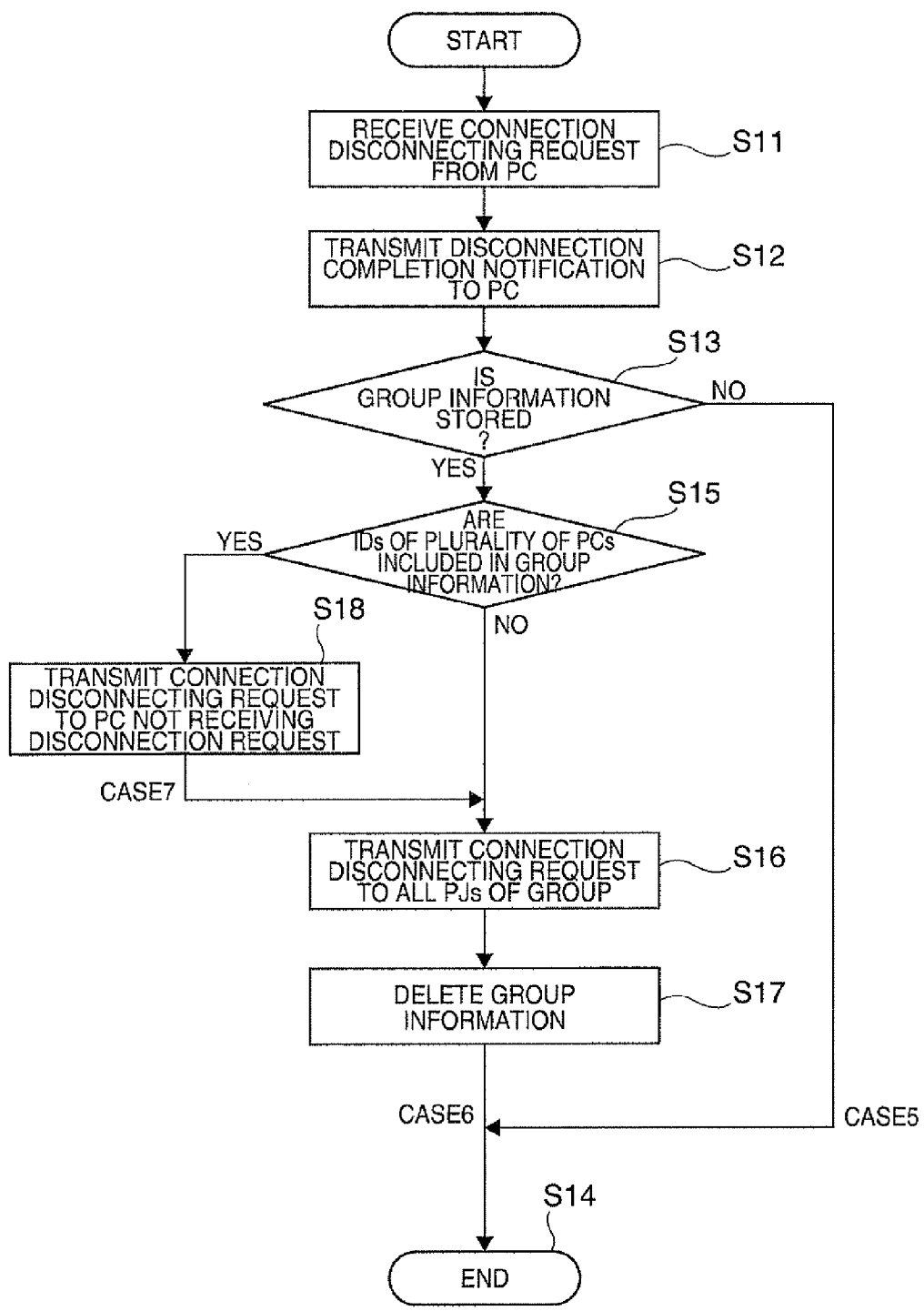
FIG. 17 is a flowchart illustrating a connection disconnecting operation of a projector.

Next, a connection disconnecting operation of the projector PJ (PJ1) will be described with reference to FIG. 17. When the PC connection disconnecting request unit 43a receives the apparatus ID and the connection disconnecting request from an arbitrary computer PC (PC1) (S11), the projector PJ1 (the communication control unit 38) transmits the apparatus ID of the own apparatus and a connection completion notification to the computer PC1 having received the disconnection request (S12). Then, the group information determination unit 63 determines whether the group information is stored in the group information storage unit 32 (S13). When the group information is not stored (NO in S13), the connection disconnecting operation ends (S14). The flow up to this step is referred to as CASE 5 (see FIG. 19A).

On the other hand, when the group information is stored (YES in S13), the group information determination unit 63 determines whether the apparatus IDs of the plurality of computers PC are included in the group information (S15). When the apparatus IDs of the plurality of computers PC are not included (NO in S15), the apparatus ID of the computer PC1 and the connection disconnecting request are transmitted to the projectors PJ2 and PJ3 corresponding to all of the IDs included in the group information excluding the own apparatus (S16), the group information stored in the group information storage unit 32 is deleted (S17), and then the connection disconnecting operation ends (S14). The flow up to this step is referred to as CASE 6 (see FIG. 19B).

When the apparatus IDs of the plurality of computers PC are included in the group information (YES in S15), the apparatus ID of the own apparatus and the connection disconnecting request are transmitted to the computer PC2 excluding the computer PC1 having received the disconnection request (S18). In addition, the apparatus ID of the computer PC1 and the connection disconnecting request are transmitted to the projectors PJ2 and PJ3 corresponding to all of the apparatus IDs included in the group information excluding the own apparatus (S16), the group information stored in the group information storage unit 32 is deleted (S17), and the connection disconnecting operation ends (S14). The flow up to this step is referred to as CASE 7 (see FIG. 19C).

Figure 18:
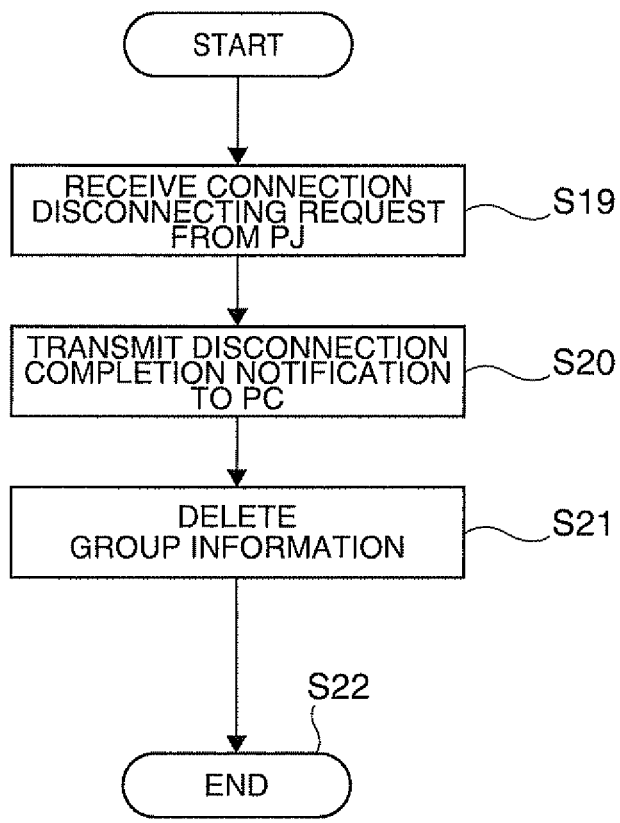
FIG. 18 is a flowchart illustrating a process of deleting group information in the projector.

On the other hand, as shown in FIG. 18, when the apparatus IDs (for example, "PC1" and "PC2") and the connection disconnecting request are received from the projector PJ excluding the own apparatus (S19), the projector PJ (communication control unit 38) transmits the apparatus ID of the own apparatus and the disconnection completion notification to all of the computers PC (PC1 and PC2) corresponding the received apparatus IDs (S20). Then, the group information stored in the group information storage unit 32 is deleted (S21), and then the connection disconnecting operation ends (S22).

Figure 19A:
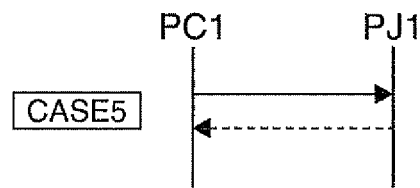
FIG. 19A is a diagram illustrating the connection disconnecting operation between the apparatus in CASE 5 of FIG. 17.
Figure 19B:
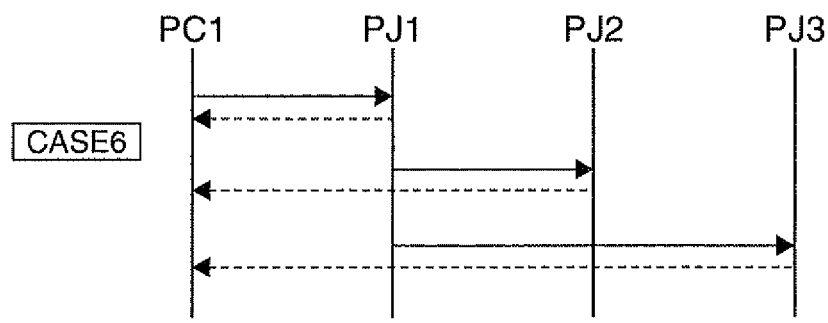
FIG. 19B is a diagram illustrating the connection disconnecting operation between the apparatus in CASE 6 of FIG. 17.
Figure 19C:
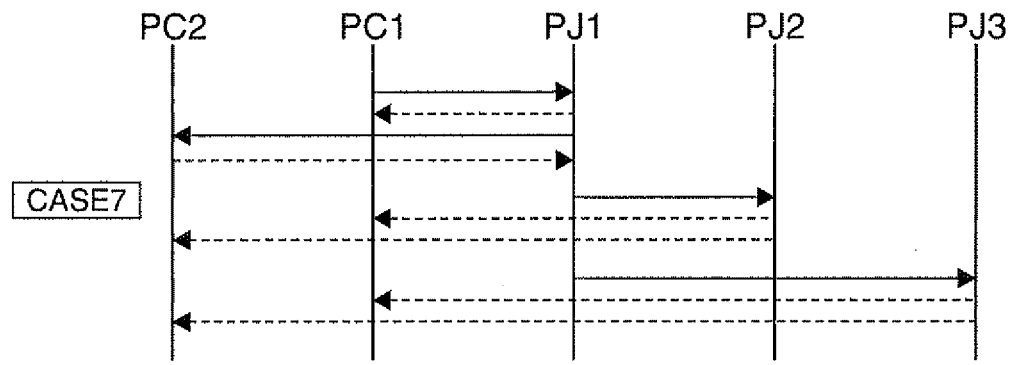
FIG. 19C is a diagram illustrating the connection disconnecting operation between the apparatus in CASE 7 of FIG. 17.

Next, the connection disconnecting operation between the computers PC1 and PC2 and the projectors PJ1, PJ2, and PJ3 will be described with reference to FIGS. 19A to 19C. FIGS. 19A to 19C are diagrams illustrating the operations of the respective apparatuses in CASE 5, CASE 6, and CASE 7. An arrow indicated by a solid line in FIGS. 19A to 19C represents a "connection disconnecting request" and an arrow indicated by a dotted line represents a "disconnection completion notification".

When the group information is not stored and when the apparatus ID "PC1" and the connection disconnecting request are transmitted from the computer PC1 to the projector PJ1 in CASE 5, as shown in FIG. 19A, the projector PJ1 transmits the apparatus ID "PJ1" and the disconnection completion notification to the computer PC1.

When the group information is stored and the apparatus IDs of the plurality of computers PC are not included in the group information (for example, group information "Group A: PC1, PJ1, PJ2, and PJ3") and when the apparatus ID "PC1" and the connection disconnecting request are transmitted from the computer PC1 to the projector PJ1 in CASE 6, as shown in FIG. 19B, the projector PJ1 transmits the apparatus ID "PC1" and the disconnection completion notification to the computer PC1 and transmits the apparatus ID "PC1" and the connection disconnecting request to the projectors PJ2 and PJ3. The projectors PJ2 and PJ3 having received the apparatus ID "PC1" and the connection disconnecting request each transmit the apparatus ID "PC2" or "PJ3" and the disconnection completion notification to the computer PC1.

On the other hand, when the apparatus IDs of the plurality of computers PC are included in the group information (for example, "Group A: PC1, PC2, PJ1, PJ2, and PJ3") and when the apparatus ID "PC1" and the connection disconnecting request are transmitted from the computer PC1 to the projector PJ1 in CASE 7, as shown in FIG. 19C, the projector PJ1 transmits the apparatus ID "PJ1" and the disconnection completion notification to the computer PC1 and transmits the apparatus ID "PJ1" and the connection disconnecting request to the computer PC2 having not received the connection disconnecting request. The computer PC2 having received the apparatus ID "PJ1" and the connection disconnecting request transmits the disconnection completion, notification to the projector PJ1. In addition, the projector PJ1 transmits the apparatus IDs "PC1" and "PC2" and the connection disconnecting request to the projectors PJ2 and PJ3. The projectors PJ2 and PJ3 having received the apparatus IDs "PC1" and "PC2" and the connection disconnecting request each transmit the apparatus ID "PJ2" or "PJ3" to the computers PC1 and PC2 and the disconnection completion notification.

When the connection disconnecting request is transmitted from one arbitrary computer PC to one arbitrary projector PJ in the state where the group information is stored in the projector PJ and the plurality of computers PC is connected to the plurality of projectors PJ, the connection between all of the apparatuses of the group is disconnected.

In the projector system SY described above, each of the projectors PJ stores the apparatus IDs of the plurality of projectors PJ and the plurality of computers PC of the group as the group information. Therefore, when the computer PC transmits the connection request to one arbitrary projector PJ of the group, the arbitrary projector PJ transmits the connection request to the projectors PJ excluding the own apparatus instead of the computer PC, referring to the stored apparatus IDs. Accordingly, the connection can easily be established. In particular, when the plurality of computers PC are intended to be connected to the plurality of projectors PJ connected to the network NW, the connection can easily be established and thus convenience can be achieved.

In the projector system SY, a desired projector PJ or a desired computer PC can be additionally connected or disconnected, while the once established group connection is maintained.

In the above-described embodiment, it is necessary for the first computer PC to give the connection request to each of the projectors PJ. However, the group information may be stored in advance in each of the projectors. With such a configuration, it is not necessary for the computer PC to give the connection request to each of the projectors PJ forming the group, and thus the first computer PC can be simply connected to the plurality of grouped projectors PJ. Moreover, the group information may be stored in one projector PJ, and then the one projector PJ may transmit the group information to the projectors PJ excluding the own apparatus when receiving the connection request from an arbitrary computer PC. Thus, since only one projector PJ stores the group information, the connection can be realized more simply.

In the above-described embodiment, when the computer PC1 gives the connection disconnecting request to the projector PJ1, the projector PJ1 gives the connection disconnecting request to all of the computers PC and the projectors PJ of the group. However, when computer PC1 gives the connection disconnecting operation, the computer PC1 may give the connection disconnecting request to the projector PJ1 and all of the computers PC of the group and the projector PJ1 may give the connection disconnecting request to the projectors PJ of the group excluding the own apparatus.

The computer PC and the projector PJ initially establishing the connection may be set as the main computer PC and the main projector PJ and the computer PC and the projector PJ later establishing the connection may be distinguished and stored. With such a configuration, the entire connection of the group may be released only when the main computer PC gives the connection disconnecting request. Alternatively, the connection with all of the projectors PJ of the group may be established only when the connection request is given to the main projector PJ. Thus, the connection state between the apparatuses can be managed by the main computer PC and the main projector PJ.

In the above-described embodiment, a transmission type liquid crystal display method is used. The display principle of the projector PJ is not limited and a reflection type liquid crystal display method, a CRT display method, a light switch display method (micro mirror device method), or the like may be used. The invention may be appropriately modified in various forms without departing from the gist of the invention.

The present application claim priority from Japanese Patent Application No. 2010-072422 filed on Mar. 26, 2010, and No. 2011-006678 filed on Jan. 17, 2011, which is hereby incorporated by reference in its entirety.

What is claimed is:

1. A projector system comprising:
a plurality of computers connected to a network; and
a plurality of projectors connected to the network,
wherein each of the computers includes a connection request unit which gives a connection request to an arbitrary one of the projectors connected to the network, and
each of the projectors includes
a group information acquisition unit which acquires group information including apparatus identifications (IDs) of the respective projectors of a group to which the respective projector belongs, and
a connection request unit which requests the projectors excluding the respective projector among the projectors of the group to connect with an arbitrary one of the computers, referring to the group information, when receiving the connection request from the arbitrary one of the computers, the connection request unit of the projector transmitting a connection request to the projectors excluding the respective projector in response to receiving the connection request sent to the connection request unit of the projector by the arbitrary one of the computers, and the projectors excluding the respective projector transmitting a connection completion notification to the arbitrary one of the computers in response to receiving the connection request from the connection request unit of the projector.

2. The projector system according to claim 1, wherein at least one computer of the plurality of computers further includes a group information generation unit which groups the plurality of projectors connected to the network and generates the group information, and each of the projectors acquires the group information from the arbitrary one of the computers.

3. The projector system according to claim 1, wherein each of the projectors further includes a group information transmission unit which transmits the group information to the projectors excluding the respective projector, when receiving the connection request from the arbitrary one of the computers.

4. The projector system according to claim 1, wherein the group information includes apparatus IDs of the respective computers of the group, and referring to the group information, the connection request unit of each projector requests the computers excluding the computer receiving the connection request among the computers of the group to connect with the respective projector, when receiving the connection request from the arbitrary one of the computers.

5. The projector system according to claim 1, wherein each of the projectors further includes a group information storage unit which stores the group information, a group information determination unit which determines whether the group information is stored in the group information storage unit, when receiving the connection request from the arbitrary one of the computers, and a group information generation unit which generates the apparatus IDs of the respective projectors of the group and an apparatus ID of the computer giving the connection request, when the group information determination unit determines that the group information is not stored and the plurality of projectors including the respective projector is grouped by the connection request, and the group information storage unit which stores the group information generated by the group information generation unit.

6. The projector system according to claim 5, wherein each of the projectors further includes a connection request determination unit which determines whether there is another projector to which the arbitrary one of the computers gives the connection request, when the group information determination unit which determines that the group information is stored, and when the connection request determination unit determines that there is another projector to which the arbitrary one of the computers gives the connection request, the connection request unit does not give the connection request to the another projector.

7. The projector system according to claim 1, wherein each of the computers further includes a disconnection request unit which gives a connection disconnecting request to the arbitrary one of the projectors of the group, and each of the projectors further includes a disconnection request unit which requests the computer which has not received the connection disconnecting request among the computers of the group to disconnect the connection from the respective projector, when receiving the connection disconnecting request from the arbitrary computer.

8. The projector system according to claim 1, wherein each of the computers further includes a disconnection request unit which gives a connection disconnecting request to the arbitrary one of the projectors, and each of the projectors further includes a disconnection request unit which requests the projectors excluding the respective projector among the projectors of the group to disconnect the connection from the arbitrary one of the computers, when receiving the connection disconnecting request from the arbitrary one of the computers.

9. The projector system according to claim 7, wherein each of the projectors further includes a group information transmission unit which transmits group information excluding the apparatus ID of the respective projector to the projectors excluding the respective projector among the projectors of the group, when receiving the connection disconnecting request from the arbitrary one of the computers.

10. The projector system according to claim 1, wherein each of the computers further includes a group information storage unit which stores the group information in a non-volatile manner, and a display unit which reads and displays the group information stored in the group information storage unit.

11. The projector system according to claim 5, wherein the group information storage unit of each of the projectors stores the group information in a non-volatile manner, and each of the computers further includes a group information reading unit which reads the group information stored in the group information storage unit of each projector.

12. The projector system according to claim 1, wherein the computer further includes a group information acquisition unit which acquires group information regarding a group formed by projectors excluding the respective projector which are connected to the network.

13. A connection establishment method of establishing connection between a plurality of computers and a plurality of projectors connected to a network, comprising:

requesting, by an arbitrary one of the plurality of computers, a connection request to an arbitrary projector of the plurality of projectors;

acquiring, by each of the plurality of projectors, group information including apparatus IDs of the projectors of a group to which the arbitrary projector belongs;

requesting, by the arbitrary projector, the projectors excluding the arbitrary projector among the projectors of the group to establish connection with an arbitrary computer, referring to the group information, when the arbitrary projector receives the connection request from the arbitrary computer, the requesting by the arbitrary projector including transmitting a connection request to the projectors excluding the arbitrary projector in response to receiving the connection request sent to the arbitrary projector by the arbitrary computer; and transmitting, by the projectors excluding the respective projector, a connection completion notification to the arbitrary computer in response to receiving the connection request from the arbitrary projector.

14. A projector comprising:
a communication unit adapted to communicate with a plurality of other projectors and a plurality of computers over a network, the communication unit including:
a group information acquisition unit which acquires group information including apparatus identifications (IDs) of respective ones of the other projectors which belong to a group of projectors to which the projector belongs, and
a connection request unit which requests the other projectors among the projectors of the group to connect with an arbitrary one of the computers, referring to the group information, when receiving a connection request from the arbitrary one of the computers, the connection request unit of the projector transmitting a connection request to the other projectors in response to receiving the connection request sent to the connection request unit of the projector by the arbitrary one of the computers, and the other projectors transmitting a connection completion notification to the arbitrary one of the computers in response to receiving the connection request from the connection request unit of the projector.

15. The projector according to claim 14, wherein
the projector further includes a group information transmission unit which transmits the group information to the projectors excluding the respective projector, when receiving the connection request from the arbitrary one of the computers.

16. The projector according to claim 14, wherein
the group information includes apparatus IDs of the respective computers of the group, and
referring to the group information, the connection request unit of the projector requests the computers excluding the one of the computers receiving the connection request to connect with the projector, when receiving the connection request from the arbitrary one of the computers.

17. The projector according to claim 14, further comprising:
a group information storage unit which stores the group information,
a group information determination unit which determines whether the group information is stored in the group information storage unit, when receiving the connection request from the arbitrary one of the computers, and
a group information generation unit which generates the apparatus IDs of the respective projectors of the group and an apparatus ID of the computer giving the connection request, when the group information determination unit determines that the group information is not stored and the plurality of projectors including the respective projector is grouped by the connection request.

18. The projector according to claim 14, further comprising
a connection request determination unit which determines whether there is another one of the projectors to which the arbitrary one of the computers gives the connection request, when the group information determination unit which determines that the group information is stored, and
when the connection request determination unit determines that there is another projector to which the arbitrary one of the computers gives the connection request, the connection request unit does not give the connection request to the another projector.

19. The projector according to claim 14, further comprising
a disconnection request unit which requests the computer which has not received a connection disconnecting request among the computers of the group to disconnect the connection from the projector, when receiving the connection disconnecting request from the arbitrary computer.

20. The projector according to claim 19, further comprising
a group information transmission unit which transmits group information excluding the apparatus ID of the projector to the other projectors among the projectors of the group, when receiving the connection disconnecting request from the arbitrary one of the computers.

* * * * *